United States Patent
Radford et al.

(10) Patent No.: US 10,450,040 B2
(45) Date of Patent: Oct. 22, 2019

(54) RE-CONFIGURABLE SUBSEA ROBOT

(71) Applicant: Houston Mechatronics, Inc., Webster, TX (US)

(72) Inventors: Nicolaus Radford, Webster, TX (US); John Yamokoski, Webster, TX (US); Chad Tobler, Webster, TX (US)

(73) Assignee: Houston Mechatronics, Inc., Webster, TX (US)

(*) Notice: Subject to any disclaimer, the term of this patent is extended or adjusted under 35 U.S.C. 154(b) by 49 days.

(21) Appl. No.: 15/449,803

(22) Filed: Mar. 3, 2017

(65) Prior Publication Data

US 2018/0251199 A1  Sep. 6, 2018

(51) Int. Cl.
| | |
|---|---|
| *B63B 7/04* | (2006.01) |
| *B63G 8/00* | (2006.01) |
| *B63G 8/08* | (2006.01) |
| *B25J 11/00* | (2006.01) |

(52) U.S. Cl.
CPC ............. *B63G 8/001* (2013.01); *B25J 11/00* (2013.01); *B63B 7/04* (2013.01); *B63G 8/08* (2013.01); *B63G 2008/004* (2013.01); *B63G 2008/005* (2013.01); *Y02T 90/38* (2013.01); *Y10S 901/15* (2013.01); *Y10S 901/46* (2013.01)

(58) Field of Classification Search
CPC .... B63G 8/00; B63G 8/14; B63G 8/08; B63B 1/00; B64D 1/12
USPC ........ 701/2; 700/245; 114/289, 338; 606/79, 606/130
See application file for complete search history.

(56) References Cited

U.S. PATENT DOCUMENTS

| | | | |
|---|---|---|---|
| 5,995,882 A | 11/1999 | Patterson et al. | |
| 6,572,422 B2 | 6/2003 | Kirkwood et al. | |
| 6,581,537 B2 | 6/2003 | McBride et al. | |
| 6,959,895 B2 | 11/2005 | Cylinder | |
| 8,205,570 B1 | 6/2012 | Tureaud et al. | |
| 8,397,657 B2 | 3/2013 | Guerrero et al. | |
| 8,418,642 B2 | 4/2013 | Vosburgh | |
| 8,701,584 B2 | 4/2014 | Kalwa | |
| 9,022,738 B1 | 5/2015 | Silberg et al. | |
| 9,051,036 B2 | 6/2015 | Kim et al. | |
| 9,090,320 B2* | 7/2015 | Rufo | F16F 1/025 |
| 9,120,546 B1 | 9/2015 | Geder et al. | |
| 9,193,423 B2* | 11/2015 | Firkan | B63G 8/00 |
| 9,205,902 B2 | 12/2015 | Sylvia et al. | |
| 9,315,248 B2 | 4/2016 | Williams | |
| 9,381,987 B1* | 7/2016 | Dufour | B64D 1/12 |
| 9,404,906 B2* | 8/2016 | Thomas | G01C 13/00 |
| 9,849,954 B1* | 12/2017 | Jun | B62D 57/032 |
| 2017/0355431 A1* | 12/2017 | Jun | B62D 57/032 |
| 2018/0079086 A1* | 3/2018 | Patel | F16L 1/265 |

* cited by examiner

*Primary Examiner* — Thomas G Black
*Assistant Examiner* — Wae L Louie
(74) *Attorney, Agent, or Firm* — Osha Liang LLP

(57) ABSTRACT

A submersible robot includes a re-configurable body transformable between at least a first configuration and a second configuration such that the re-configurable body, in the first configuration, has a hydrodynamic shape configured for efficient travel in a subsea environment, and such that the re-configurable body, in the second configuration, has a shape configured for performing a robotic task in the subsea environment.

31 Claims, 31 Drawing Sheets

RE-CONFIGURABLE SUBSEA ROBOT

BACKGROUND

Unmanned underwater vehicles (UUVs), as shown in FIG. 1, generally have two missions: data gathering or manipulation. UUVs generally fall in two categories: remotely operated underwater vehicles (ROVs) which may be controlled by a remote human operator, and autonomous underwater vehicles (AUVs) which may operate independently without direct human input. Current vehicle designs are optimized and limited to performing one mission or the other.

Long-range observation and data gathering missions involve activities such as oceanographic data surveys, communication cable inspections, and subsea topographical surveys. Vehicles used for these types of activities are typically AUVs and are non-hovering, tetherless, torpedo-shaped hulls optimized for long-range cruising. Therefore, while suitable for long-range travel and remote sensing, these vehicles are not suitable for manipulation activities because they are unable to perform precise maneuvers or to perform robotic tasks.

On the other hand, most manipulation missions are performed by ROV designs. These vehicles are specifically aimed at subsea manipulation and are typically tethered to topside support vessels for power and communication. As such, they take advantage of high data rates and the power rich environment afforded by the tether. However, vehicles of this type are unable to efficiently travel long distances and require a locally-situated control vessel for operation.

In view of above, the present disclosure aims to address the emerging need for the hybrid operation: a highly maneuverable platform that can perform manipulation work and also travel efficiently for long distances. This may include deployment from shore or from some other vehicle and then traveling long distances to perform manipulation or observation work or both.

SUMMARY

In one aspect, a submersible robot comprises a re-configurable body transformable between at least a first configuration and a second configuration, such that the re-configurable body, in the first configuration, has a hydrodynamic shape configured for efficient travel in a subsea environment, and such that the re-configurable body, in the second configuration, has a shape configured for performing a robotic task in the subsea environment.

In one aspect, in the first configuration the re-configurable body has an elongated shape and is hydrodynamically designed for travel in the subsea environment generally along a longitudinal axis of the elongated shape.

In one aspect, the re-configurable body comprises a head section and a tail section such that in the first configuration a longitudinal axis of the head section and a longitudinal axis of the tail section are coincident.

In one aspect, the re-configurable body comprises a head section and a tail section such that in the second configuration a longitudinal axis of the head section and a longitudinal axis of the tail section are intersecting.

In one aspect, in the second configuration the longitudinal axis of the head section and the longitudinal axis of the tail section are intersecting.

In one aspect, the re-configurable body is transformable among the first configuration, the second configuration, and a third configuration such that in the third configuration an angle of intersection of the longitudinal axis of the head section and the longitudinal axis of the tail section is different from an angle of intersection of the longitudinal axis of the head section and the longitudinal axis of the tail section in the second configuration.

In one aspect, the submersible robot further comprises a main thruster configured, when disposed in a first position, to propel the submersible robot generally along a longitudinal axis of the re-configurable body when the re-configurable body is in the first configuration.

In one aspect, the submersible robot further comprises a plurality of deployable thrusters configured for deployment when the re-configurable body is in a configuration other than the first configuration.

In one aspect, the plurality of deployable thrusters are housed in thruster enclosures when the re-configurable body is in the first configuration.

In one aspect, the submersible robot further comprises a plurality of deployable thrusters configured for deployment when the re-configurable body is in a configuration other than the first configuration.

In one aspect, the plurality of deployable thrusters are housed in thruster enclosures when the re-configurable body is in the first configuration.

In one aspect, when the re-configurable body is in the configuration other than the first configuration, the main thruster is movable to a second position, and wherein the main thruster and the plurality of deployable thrusters cooperatively provide navigation capability to the submersible robot.

In one aspect, the submersible robot further comprises a joint connecting the head section and the tail section.

In one aspect, the submersible robot further comprises at least one robotic arm such that the at least one robotic arm is disposed in a retracted position when the re-configurable body is in the first configuration and is disposed in an extended position when the re-configurable body is in the second configuration.

In one aspect, when the at least one robotic arm is in the retracted position, the at least one robotic arm is housed in a retracted arm enclosure.

In one aspect, the submersible robot further comprises a side thruster disposed within the retracted arm enclosure.

In one aspect, the at least one robotic arm comprises a first arm joint disposed proximal the re-configurable body, a working mechanism disposed distal the re-configurable body, and a second arm joint disposed between the first arm joint and the working mechanism.

In one aspect, the submersible robot further comprises at least one robotic arm such that the at least one robotic arm is disposed in a retracted position when the re-configurable body is in the first configuration and is disposed in an extended position when the re-configurable body is in the second configuration.

In one aspect, when the at least one robotic arm is in the retracted position, the at least one robotic arm is housed in a retracted arm enclosure.

In one aspect, the submersible robot further comprises a side thruster disposed within the retracted arm enclosure.

In one aspect, the retracted arm enclosure extends along a portion of both the head section and the tail section.

In one aspect, the submersible robot further comprises a first side thruster disposed within a head section portion of the retracted arm enclosure and a second side thruster disposed within a tail section portion of the retracted arm enclosure.

In one aspect, the at least one robotic arm comprises a first arm joint disposed proximal the re-configurable body, a working mechanism disposed distal the re-configurable body, and a second arm joint disposed between the first arm joint and the working mechanism.

In one aspect, the submersible robot further comprises an internal power source, a control unit configured to execute instructions for control of the submersible robot, a sensor module configured to sense aspects of the subsea environment in a vicinity of the submersible robot, and a transceiver configured to communicate with a communication station outside the submersible robot.

In one aspect, a method for operating a submersible robot in subsea environment comprises navigating the submersible robot from a first location to a second location with the re-configurable body in the first configuration; transforming the submersible robot from the first configuration to the second configuration; performing a robotic task with the re-configurable body in the second configuration; transforming the submersible robot from the second configuration to the first configuration; and navigating the submersible robot from the second location to a third location with the re-configurable body in the first configuration such that the submersible robot comprises a re-configurable body transformable between at least a first configuration and a second configuration, and in the first configuration the re-configurable body has a hydrodynamic shape configured for efficient travel in the subsea environment and in the second configuration the re-configurable body has a shape configured for performing a robotic task in the subsea environment.

In one aspect, transforming the submersible robot from the first configuration to the second configuration comprises rotating a tail section of the re-configurable body relative to a head section of the re-configurable body.

In one aspect, transforming the submersible robot from the first configuration to the second configuration comprises moving a robotic arm from a retracted position within a robotic arm enclosure to an extended position.

In one aspect, transforming the submersible robot from the first configuration to the second configuration comprises deploying a plurality of deployable thrusters.

In one aspect, performing the robotic task comprises sensing aspects of the subsea environment in a vicinity of the submersible robot.

In one aspect, a submersible robot comprises a re-configurable body comprising a head section, a tail section, and a joint connecting the head section and the tail section, wherein the re-configurable body is transformable between at least a first configuration and a second configuration, a main thruster, a plurality of deployable thrusters, a robotic arm, and a control module such that in the first configuration, the head section and the tail section together form an elongated, hydrodynamic shape configured for efficient travel in a subsea environment, the plurality of deployable thrusters are disposed in thruster enclosures, the robotic arm is disposed in a robotic arm enclosure, and propulsion is provided by the main thruster, and such that in the second configuration the tail section is pivoted, moved, or rotated relative to the head section, the plurality of deployable thrusters are deployed, the robotic arm is extended, and propulsion is provided by a combination of the main thruster and the deployable thrusters.

BRIEF DESCRIPTION OF DRAWINGS

Certain embodiments of the present disclosure will be described with reference to the accompanying drawings. However, the accompanying drawings illustrate only certain aspects or implementations of the present disclosure by way of example and are not meant to limit the scope of the claims.

DETAILED DESCRIPTION

In general, embodiments of the present disclosure relate to submersible robots and methods for operating submersible robots.

Specific embodiments will now be described with reference to the accompanying drawings. In the following description, numerous details are set forth as examples of the present disclosure. It will be understood by those skilled in the art that one or more embodiments of the present disclosure may be practiced without these specific details and that numerous variations or modifications may be possible without departing from the scope of the invention. Certain details known to those of ordinary skill in the art are omitted to avoid obscuring the description.

Figure 1:
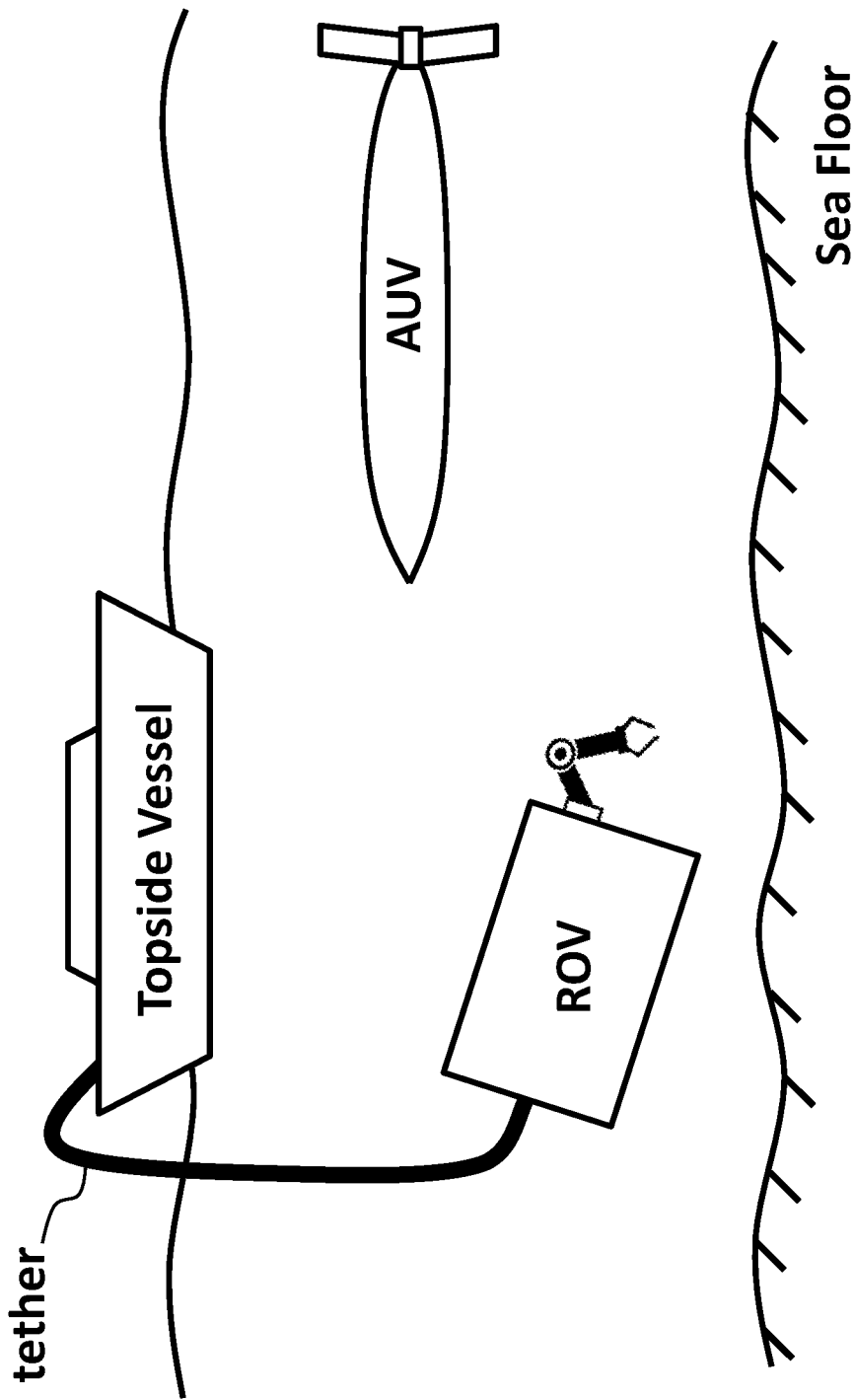
FIG. 1 shows a conventional remotely operated underwater vehicle (ROV) and a conventional autonomous underwater vehicle (AUV) in subsea environment.
Figure 2:
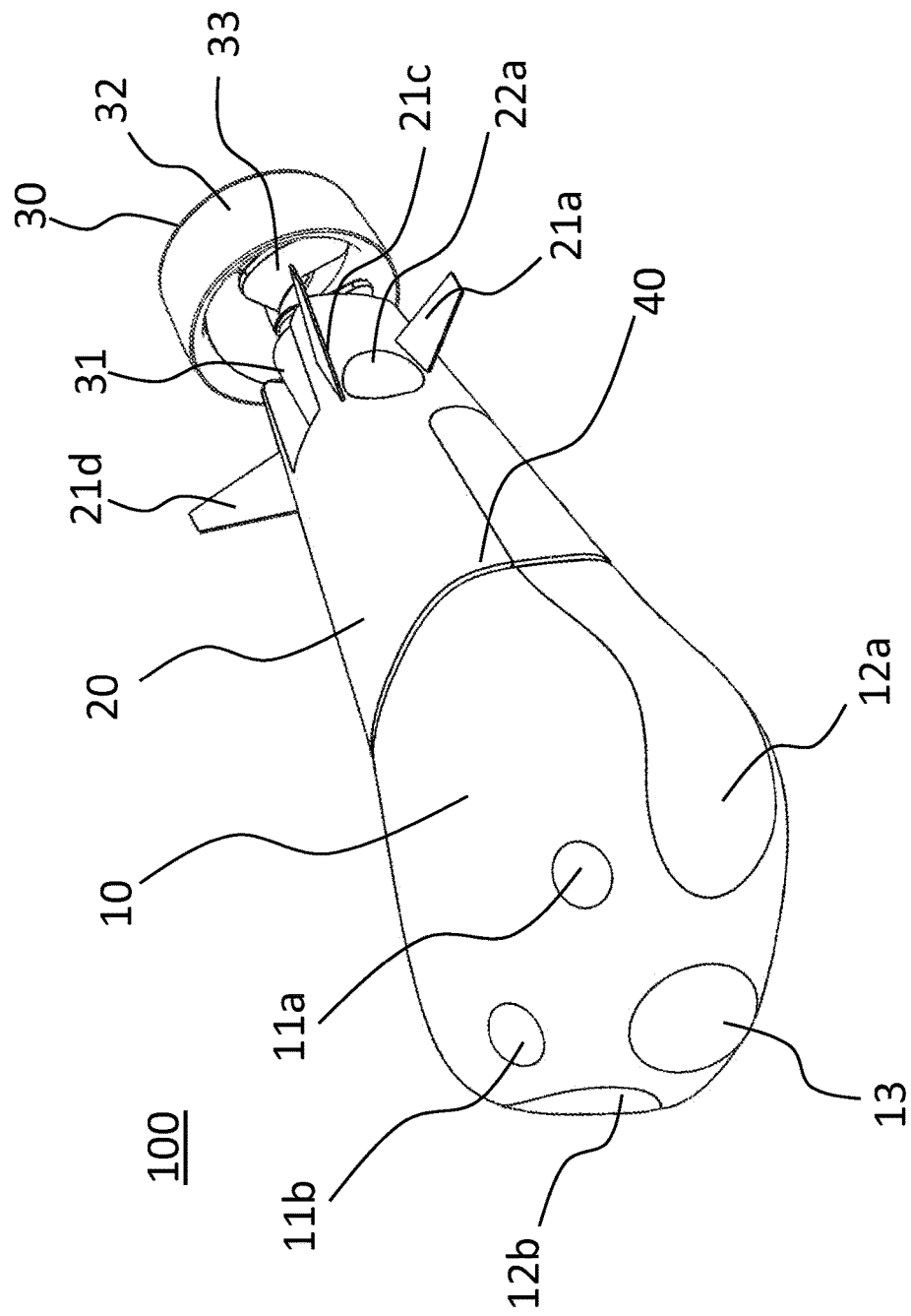
FIG. 2 shows a perspective view of a subsea robot in accordance with one or more embodiments of the present disclosure.

FIG. 2 shows a perspective view of a subsea robot in accordance with one or more embodiments of the present disclosure. The subsea robot 100 includes a head section 10, a tail section 20, at least one main thruster 30, and a head section and tail section interface 40 having a joint 41 (not shown). The head section 10 and the tail section 20 are pivotable or movable about the joint 41 to transform the subsea robot 100 between two or more configurations. The rotation of the head section 10 and the tail section 20 results in a change in the overall shape of the subsea robot 100. For example, in a first configuration the robot 100 has an elongated, hydrodynamic shape, for example, a shape that is similar to a torpedo, to produce minimum friction when the subsea robot 100 travels efficiently under water at high speed and/or for long distances. In this configuration, the main thruster 30 produces a thrust that propels the subsea robot 100 forward generally along a longitudinal axis of the hydrodynamic shape, preferably, at speeds of up to, preferably, 20 Km/hr, 40 Km/hr, 60 Km/hr, 80 Km/hr, or 100 Km/hr. The main thruster 30, when disposed in a first position, is configured to propel the subsea robot 100 generally along a longitudinal axis of the re-configurable body when the re-configurable body is in the first configuration.

As used herein, "joint" may refer to a pivot joint, a rotation joint, a linear joint, an orthogonal joint, a twisting joint, a revolving joint, or any combinations of these joints that allow different degrees and types of movement. The joint may allow relative movement of sections or segments connected to the joint, such as the head section 10 and the tail section 20, in one or two degrees of freedom, and restrict movement in two or one others, respectively. The joint may connect the head section 10 and the tail section 20 such that these two section slide over or into each other.

As used herein, "generally along a longitudinal axis" is explicitly meant to include travel in a straight, forward or rearward direction along the longitudinal axis and travel in a turning and/or up or down direction. In addition, as used herein, "re-configurable body" is meant to include the subsea robot 100 in accordance with one embodiment. In another embodiment, "re-configurable body" is meant to include a head section 10, a tail section 20, at least one main thruster 30. Yet, in another embodiment, "re-configurable" body is meant to include at least two, or preferably, more sections or segments of the subsea robot 100 that may include the head section 10, the tail section 20, or the main thruster 30.

In accordance with this embodiment, the head section 10, as shown in FIG. 2, includes a plurality of eye sections 11a, 11b, a plurality of retracted arm enclosure covers 12a, 12b, and a nose section 13. The plurality of eye sections 11a, 11b may include cameras, for example, High Definition (HD) or wide-angle cameras. The cameras may be underwater cameras that are low light cameras or equipped with infrared lights, subsea lasers, or subsea lights. The camera may record and store the video on a memory of the subsea robot 100, or may transfer the video, in real-time or with a latency, to a remote operator.

The nose section 13 may house a variety of sensors for 3D reconstruction in underwater environments. For example, light detection and ranging (LiDAR), stereo vision (SV), structure from motion (SfM), structured light (SL), laser stripe (LS) and laser line scanning (LLS) may be positioned in the nose section 13, in the eye sections 11a, 11b, and/or elsewhere on the subsea robot 100 for navigation and surveying. Other types of sensors that may be positioned in the nose section 13, in the eye sections 11a, 11b, and/or elsewhere on the subsea robot 100 include, but is not limited to, conductivity, temperature, and depth (CTD) sensors, single-beam sonar sensors, side scan sonar sensors, 3D multi-beam sonar sensors, synthetic aperture sonar sensors, and/or sub-bottom profiler sensors.

In accordance with this embodiment, the tail section 20 of the subsea robot 100, as shown in FIG. 2, includes a plurality of tail fins 21a, 21b (not shown), 21c, 21d; and a plurality of tail section thruster covers 22a, 22b (not shown). The plurality of tail fins 21a, 21b, 21c, 21d may be fixed to the tail section 20, or may be actuated, for example, electrically or mechanically, to guide the movement of the subsea robot 100 in the undersea environment. The actuation of the plurality of tail fins 21a, 21b, 21c, 21d may be performed independently from each other. The main thruster 30 of the subsea robot 100 includes a main thruster motor 31, a main thruster blade housing 32 (main thruster nozzle), and main thruster blades 33. As used herein, "thruster" is meant to include any of the thrusters included in the subsea robot 100. The thruster may be an azimuth thruster, a bow thruster, a stern thruster, a rim-driven thruster, electric motor and propeller combined in single unit, ducted jet thruster, counter-rotating thruster, and/or any other underwater thruster including an electric motor or a hydraulic motor and propeller combined in single unit to propel the subsea robot 100.

Figure 3:
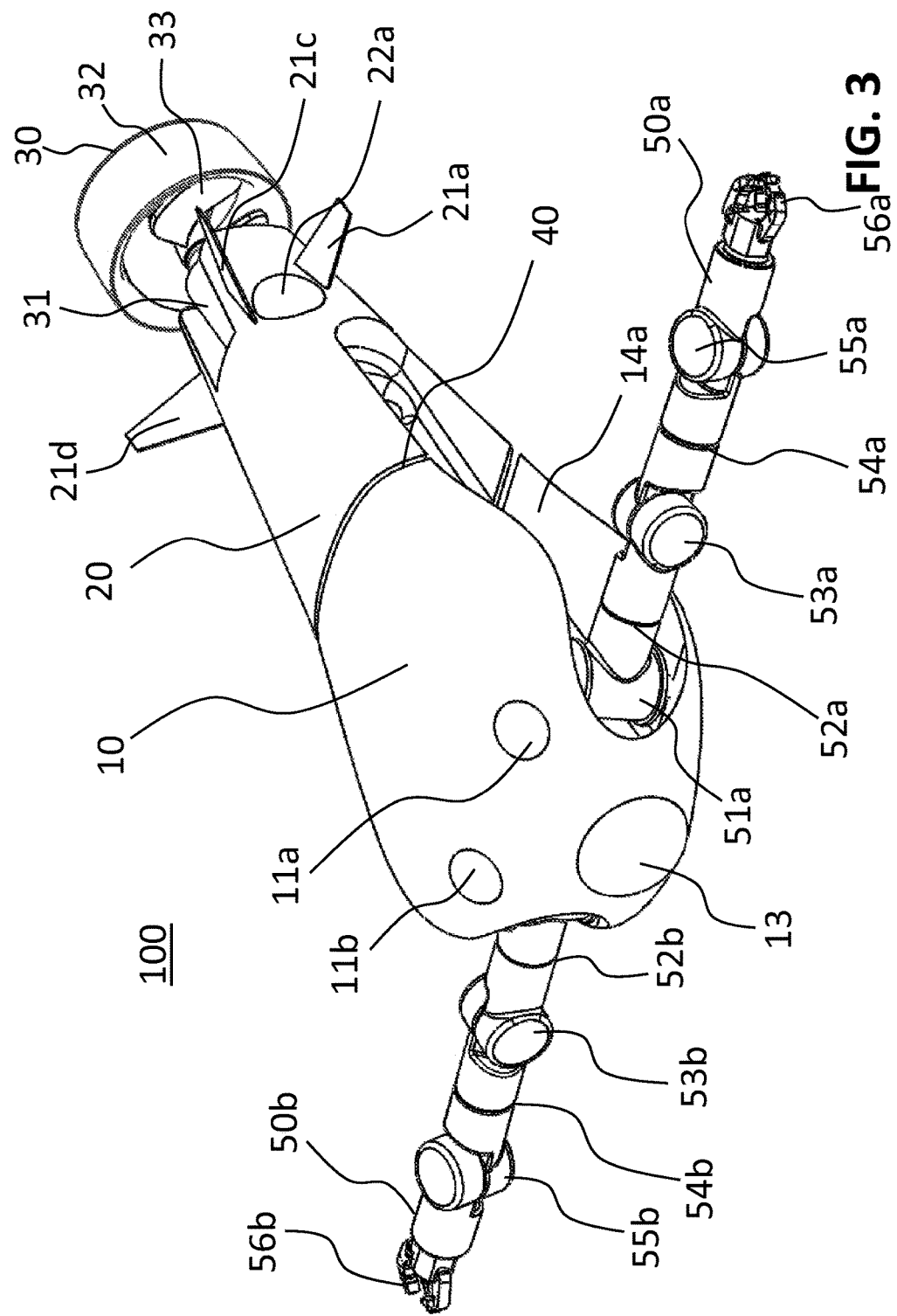
FIG. 3 shows a perspective view of a subsea robot with extended arms in accordance with one or more embodiments of the present disclosure.

FIG. 3 shows a perspective view of a subsea robot with extended arms in accordance with one or more embodiments of the present disclosure. In accordance with this embodiment, the subsea robot 100 includes a plurality of arms 50a, 50b comprising a plurality of first arm joints 51a, 51b; a plurality of first rotation interfaces 52a, 52b; a plurality of second arm joints 53a, 53b; a plurality of second rotation interfaces 54a, 54b; a plurality of third arm joints 55a, 55b; and a plurality of working mechanisms 56a, 56b. The plurality of arms 50a, 50b are robotic arms that are extended, in a working position of the subsea robot 100 to perform a variety of tasks, for example, opening or closing of valves. The plurality of working mechanisms 56a, 56b may include, for example, a plurality of robotic fingers that are actuated to perform a plurality of tasks, a plurality of welders for underwater welding tasks, or similar modules that are specifically designed for specific underwater tasks.

In one embodiment, the subsea robot 100 includes at least one robotic arm 50a, 50b with at least one first arm joint 51a, 51b disposed proximal the re-configurable body, at least one working mechanism 56a, 56b disposed distal the re-configurable body, and at least one second arm joint 53a, 53b disposed between the at least first arm joint and the at least one working mechanism 56a, 56b. The subsea robot 100 also includes a plurality of retracted arm enclosures 14a, 14b that house the robotic arms 50a, 50b in retracted position. The plurality of retracted arm enclosures 14a, 14b may extend from the head section 10 to the tail section 20. The robotic arms 50a, 50b may move from a retracted position within the robotic arm enclosure 14a, 14b to an extended position while transforming the subsea robot 100 from the first configuration to the second configuration.

One person of ordinary skill in the art will understand that the at least one robotic arm 50a, 50b of the subsea robot 100, as disclosed herein, may include additional arm segments, including arms joints and rotation interfaces, for example, to enable the robotic arms have sufficient degrees of freedom. The plurality of arms 50a, 50b; the plurality of first arm joints 51a, 51b, the plurality of first rotation interfaces 52a, 52b, the plurality of second arm joints 53a, 53b, the plurality of second rotation interfaces 54a, 54b, the plurality of third arm joints 55a, 55b, and the plurality of working mechanisms 56a, 56b may employ one or more rotational actuators, including but not limited to, alternating current (AC) or direct current (DC) motors, servo motors, industrial servo motors, and/or stepper motors; and/or one or more linear actuators such as DC linear actuators, solenoids, muscle wires, pneumatic and hydraulic actuators, and/or piezoelectric actuators. The actuators may be geared or gearless. The control system for the actuators may be closed-loop or may be open loop.

Figure 4:
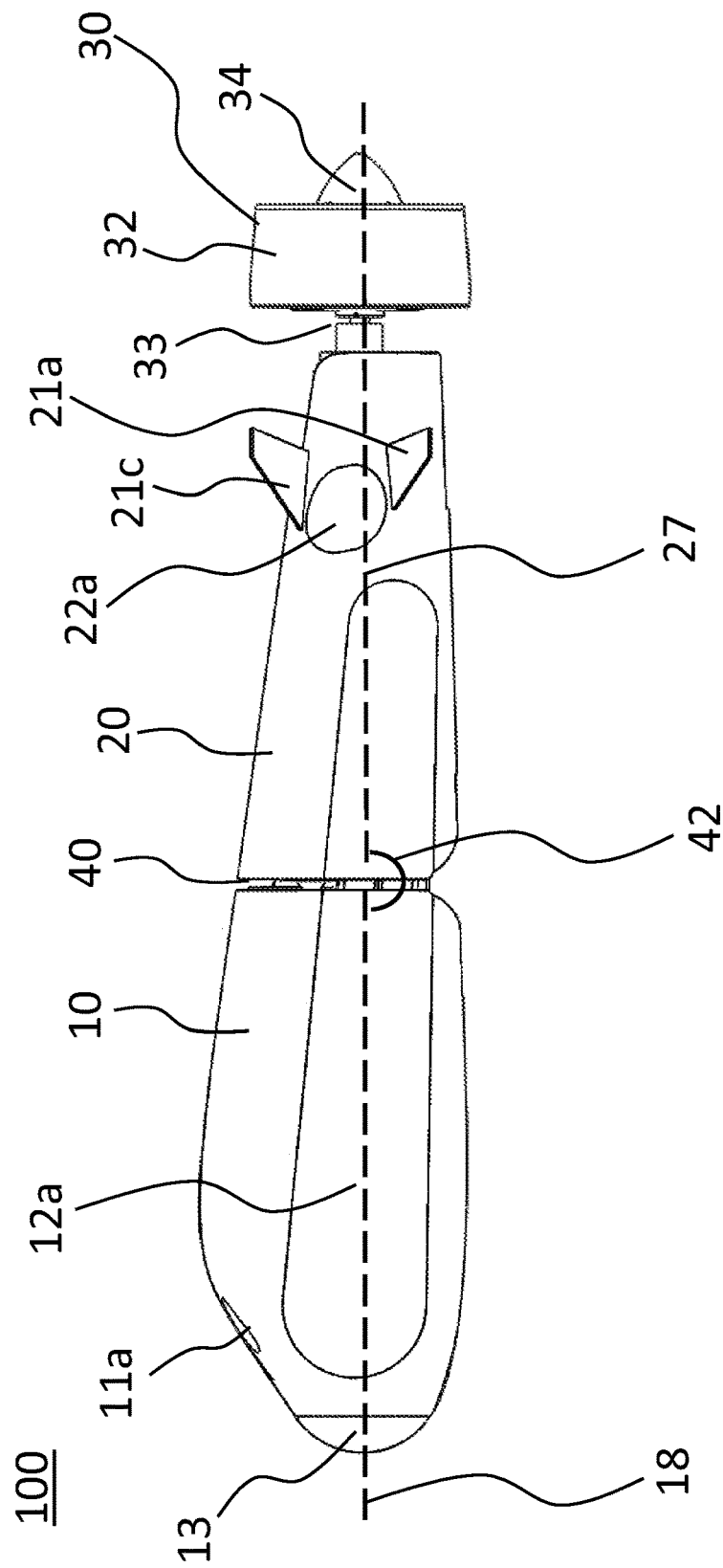
FIG. 4 shows a side view of a subsea robot in accordance with one or more embodiments of the present disclosure.

FIG. 4 shows a side view of a subsea robot in accordance with one or more embodiments of the present disclosure. In accordance with this embodiment, the head section 10 that is positioned in a front side of the subsea robot 100 has a head axis 18 in a longitudinal direction of the head section 10. The tail section 20 that is positioned in a rear side of the subsea robot 100 has a tail axis 27 in a longitudinal direction of the tail section 20. The joint section 40 that connects the head section 10 and the tail section 20, may include a joint 41 such that the head section 10 and the tail section 20 may move around the joint section 40 to transform the subsea robot 100 between a first orientation (or configuration) and a second orientation (or configuration). The head axis 18 in the longitudinal direction of the head section 10 and the tail axis 27 in the longitudinal direction of the tail section 20 form an angle 42 between the head axis 18 and the tail axis 27.

In a first configuration, the subsea robot 100 includes a head section 10 and a tail section 20 such that in the first configuration a longitudinal axis 18 or the head axis 18 of the head section 10 and a longitudinal axis 27 or the tail axis 27 of the tail section 20 are coincident. In this configuration, the subsea robot 100 has an elongated shape and is hydrodynamically designed for travel in the subsea environment generally along a longitudinal axis of the elongated shape. The longitudinal axis of the elongated shape is coincident to the longitudinal axis 18 of the head section 10 and the longitudinal axis 27 of the tail section 20 in the first configuration.

In one exemplary embodiment, in the first configuration, the angle 42 between the head axis 18 and the tail axis 27 is 180 degrees, and the subsea robot 100 is configured to travel forward from a front side of the subsea robot 100 in the subsea environment without performing any underwater operation with robotic arms. In this configuration, the plurality of arms 50a, 50b are retracted and located inside the plurality of retracted arm enclosures 14a, 14b. The plurality of retracted arm enclosure covers 12a, 12b cover the plurality of arms 50a, 50b to provide a substantially hydrodynamic and elongated shape that is hydrodynamically designed for travel in the subsea environment generally along a longitudinal axis of the elongated shape. This shape assists the subsea robot 100 to travel or navigate under water fast and at high speed. The travel speed is preferably up to 100 Km/hr.

Figure 5:
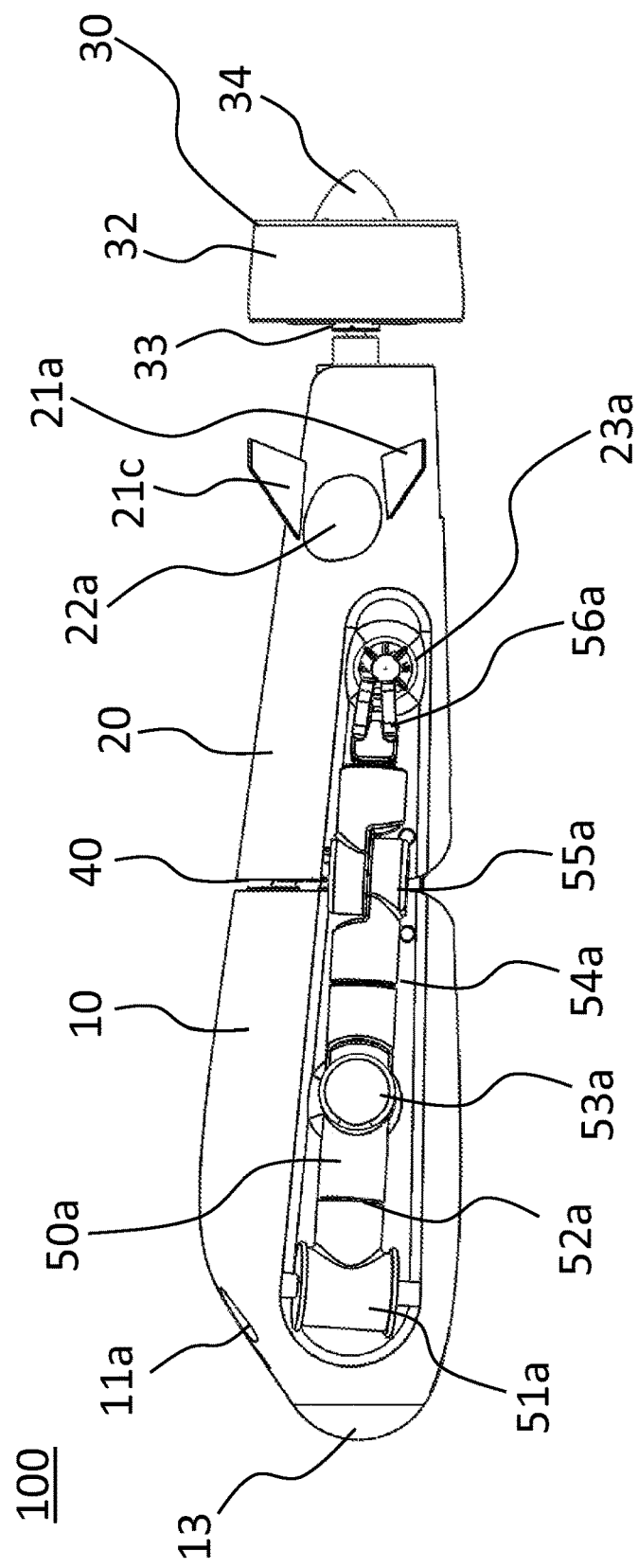
FIG. 5 shows a side view of a subsea robot in accordance with one or more embodiments of the present disclosure.
Figure 6:
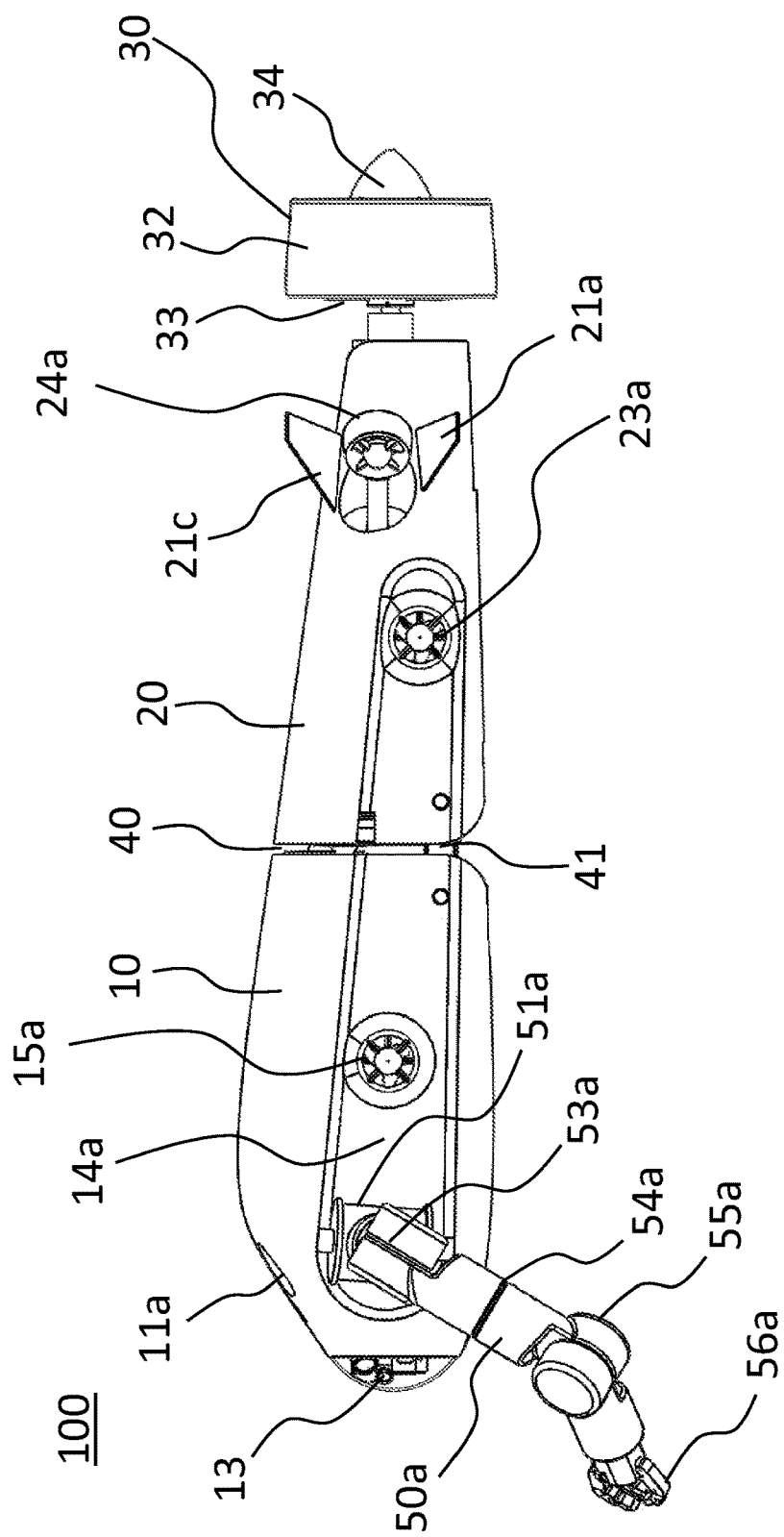
FIG. 6 shows a side view of a subsea robot with extended arms in accordance with one or more embodiments of the present disclosure.
Figure 7:
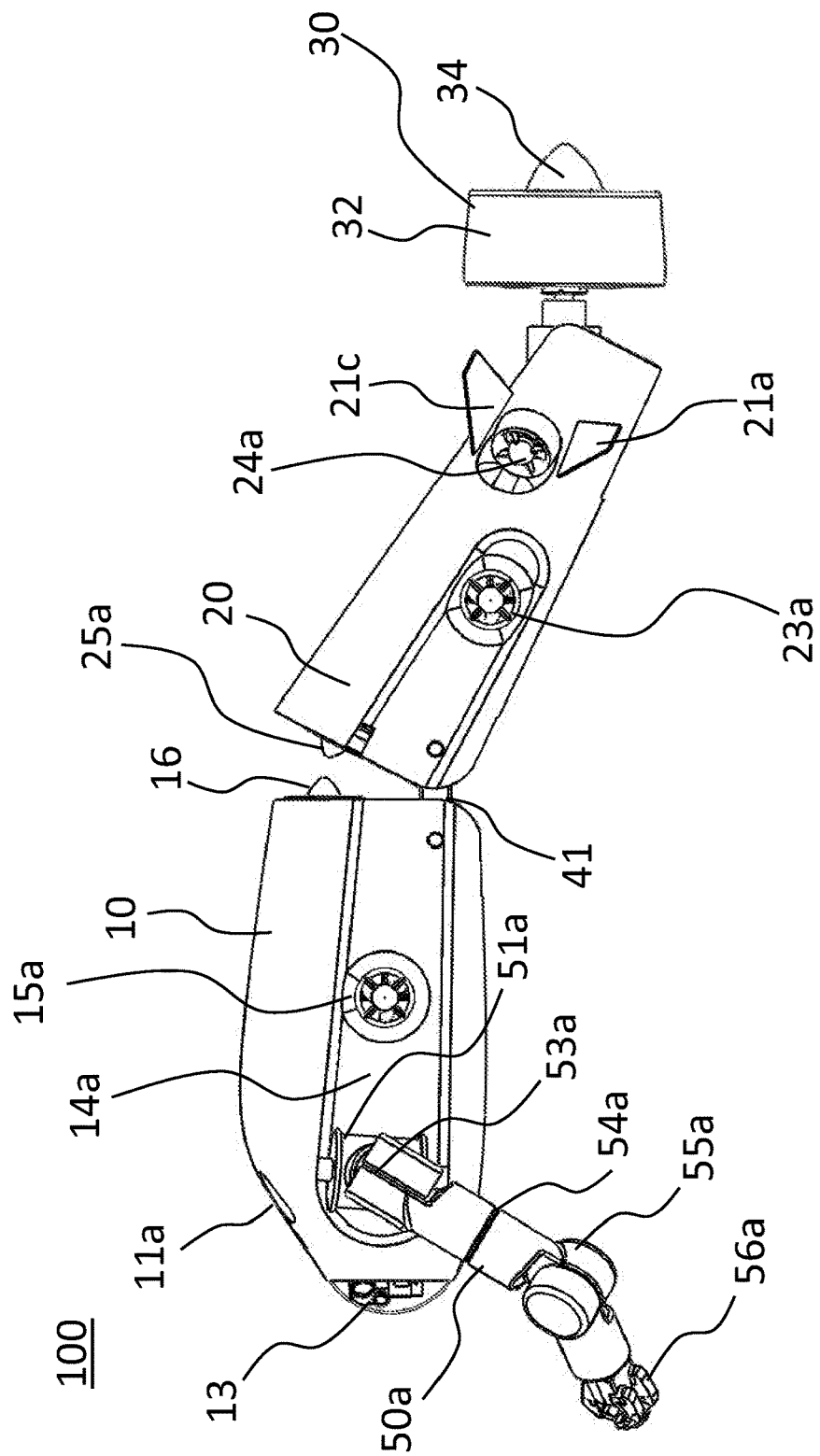
FIG. 7 shows a side view of a subsea robot with extended arms in accordance with one or more embodiments of the present disclosure.
Figure 8:
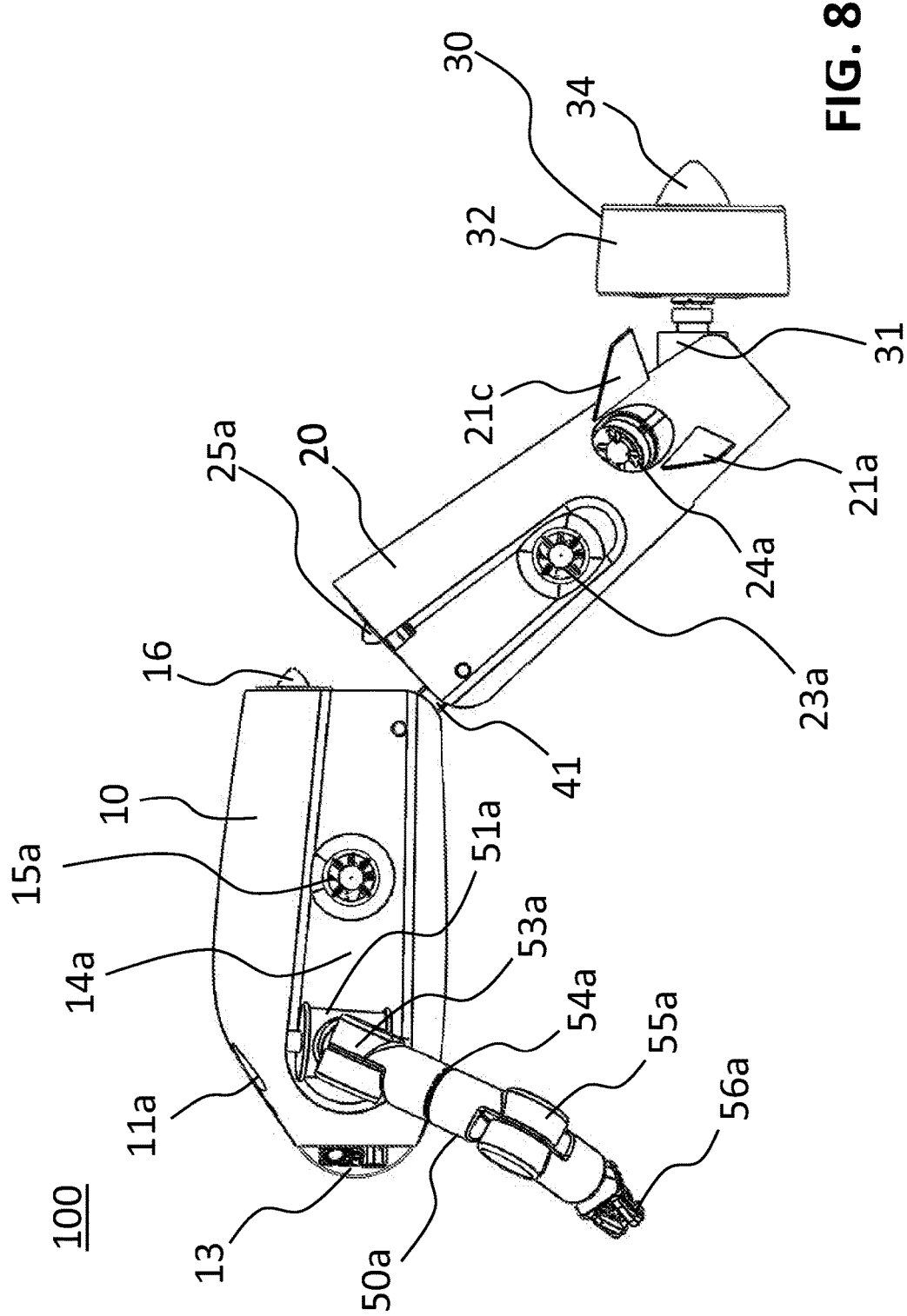
FIG. 8 shows a side view of a subsea robot with extended arms in accordance with one or more embodiments of the present disclosure.
Figure 9:
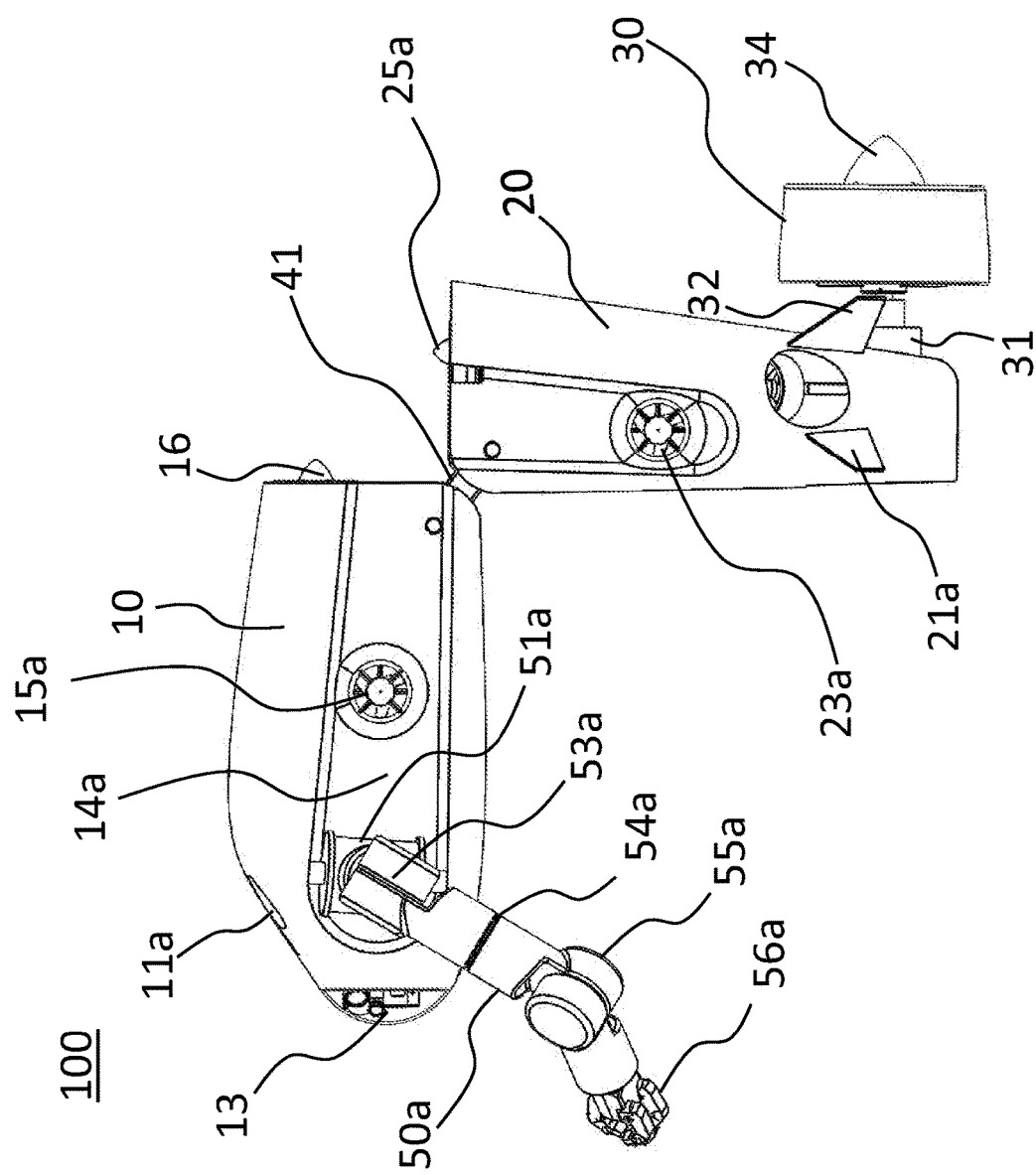
FIG. 9 shows a side view of a subsea robot with extended arms in accordance with one or more embodiments of the present disclosure.

FIG. 5 and FIG. 6 show a side view of a subsea robot with retracted and extended arms, respectively, in accordance with one or more embodiments of the present disclosure. When the transformation of the subsea robot 100 is initiated from the first configuration to the second configuration, the plurality of retracted arm enclosure covers 12a, 12b are removed or opened to allow the plurality of arms 50a, 50b to extend outside of the plurality of retracted arm enclosures 14a, 14b. During this transformation from the first configuration to the second configuration, the plurality of tail section thruster covers 22a, 22b are also removed or opened to allow a plurality of tail section retractable side thrusters 24a, 24b (not shown) be extended. Additionally, when the plurality of arms 50a, 50b (not shown) are extended, a plurality of head section side thrusters 15a, 15b (not shown) and a plurality of tail section side thrusters 23a, 23b (not shown) are also exposed and ready to produce thrust to move the subsea robot 100 in the second configuration.

FIG. 7 to FIG. 12 show side views of a subsea robot with extended arms in accordance with one or more embodiments of the present disclosure. In accordance with this embodiment, the subsea robot 100 includes a re-configurable body transformable between at least a first configuration and a second configuration such that the re-configurable body, in the first configuration, has a hydrodynamic shape configured for efficient travel in a subsea environment, and such that the re-configurable body, in the second configuration, has a shape configured for performing at least one robotic task in the subsea environment. In the first configuration, the re-configurable body has an elongated shape and is hydrodynamically designed for travel in the subsea environment generally along a longitudinal axis of the elongated shape. In the second configuration, the longitudinal axis 18 of the head section 10 and the longitudinal axis 27 of the tail section 20 are intersecting. As used herein, "efficient travel," "efficient cruising," or "efficient navigation" is meant to include achieving maximum speed or travel distance with minimum time, thrust, consumed fuel, energy, or power.

In accordance with this embodiment, the re-configurable body comprises a head section 10 and a tail section 20 such that for transformation from the first configuration to the second configuration an angle 42 between the longitudinal axis 18 of the head section 10 and the longitudinal axis 27 of the tail section 20 vary from 180 degrees (or substantially 180 degrees, for example, between 175 and 185 degrees) in the first configuration to 0 degree (or substantially 0 degree, for example, −5 and 5 degrees) in the second configuration.

Figure 10:
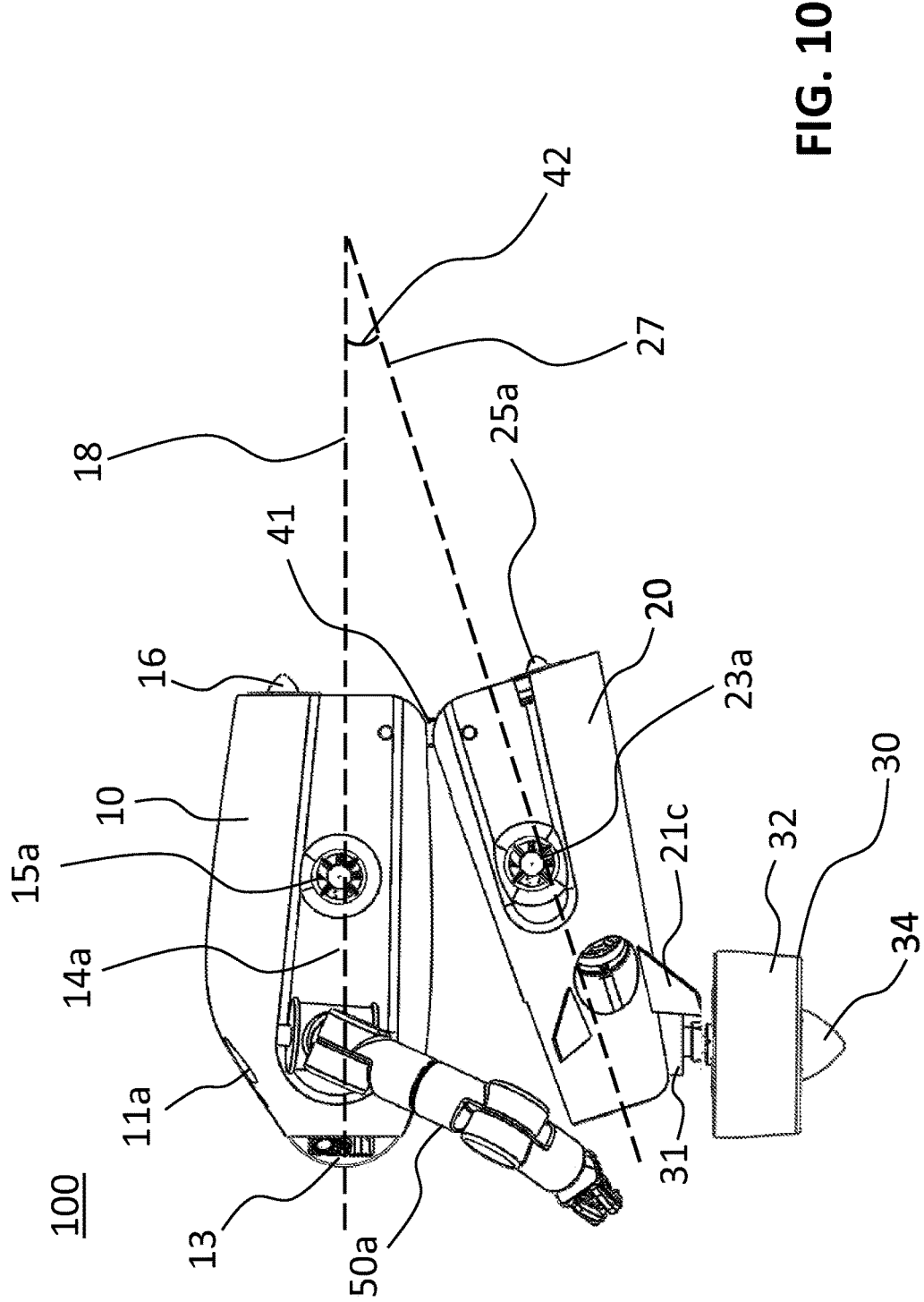
FIG. 10 shows a side view of a subsea robot with extended arms in accordance with one or more embodiments of the present disclosure.
Figure 11:
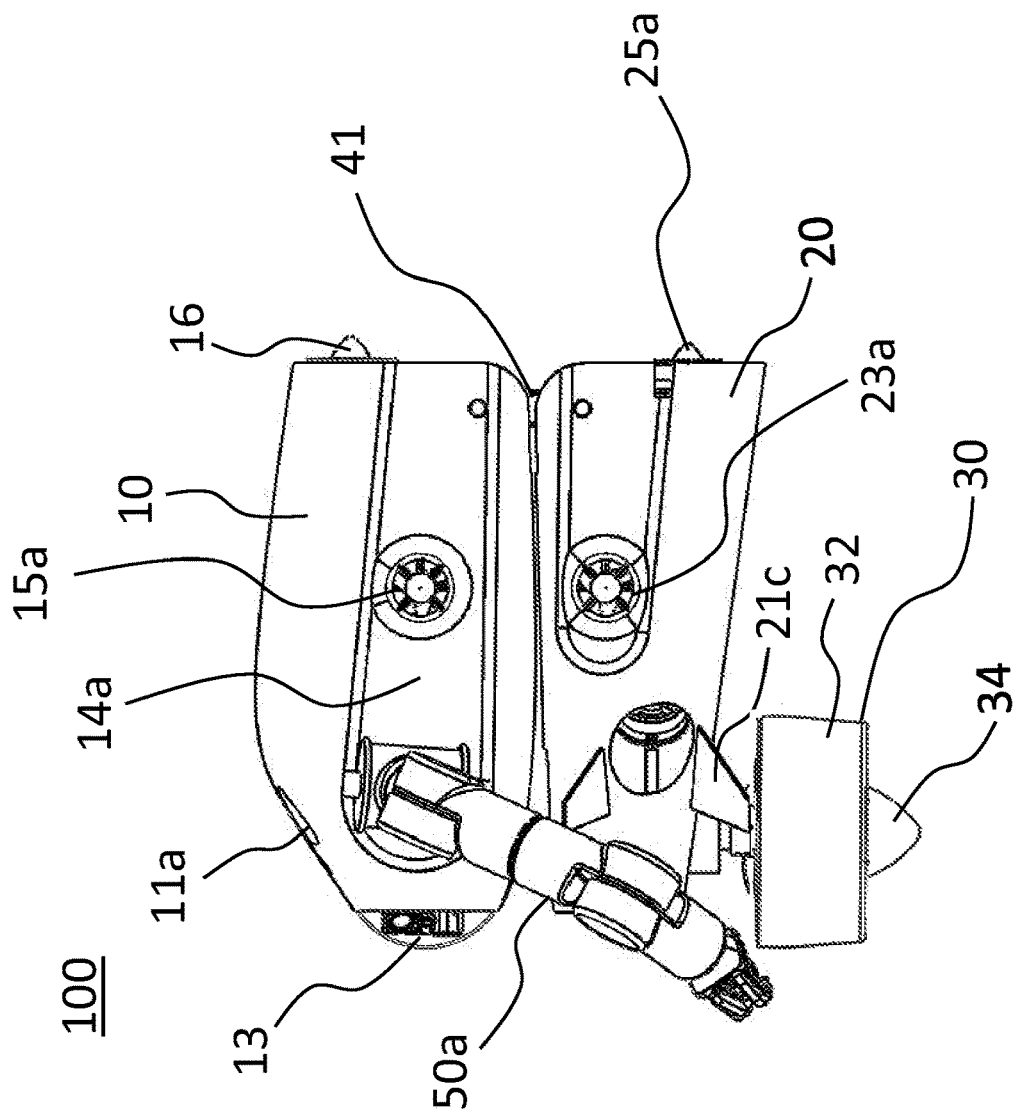
FIG. 11 shows a side view of a subsea robot with extended arms in accordance with one or more embodiments of the present disclosure.
Figure 12:
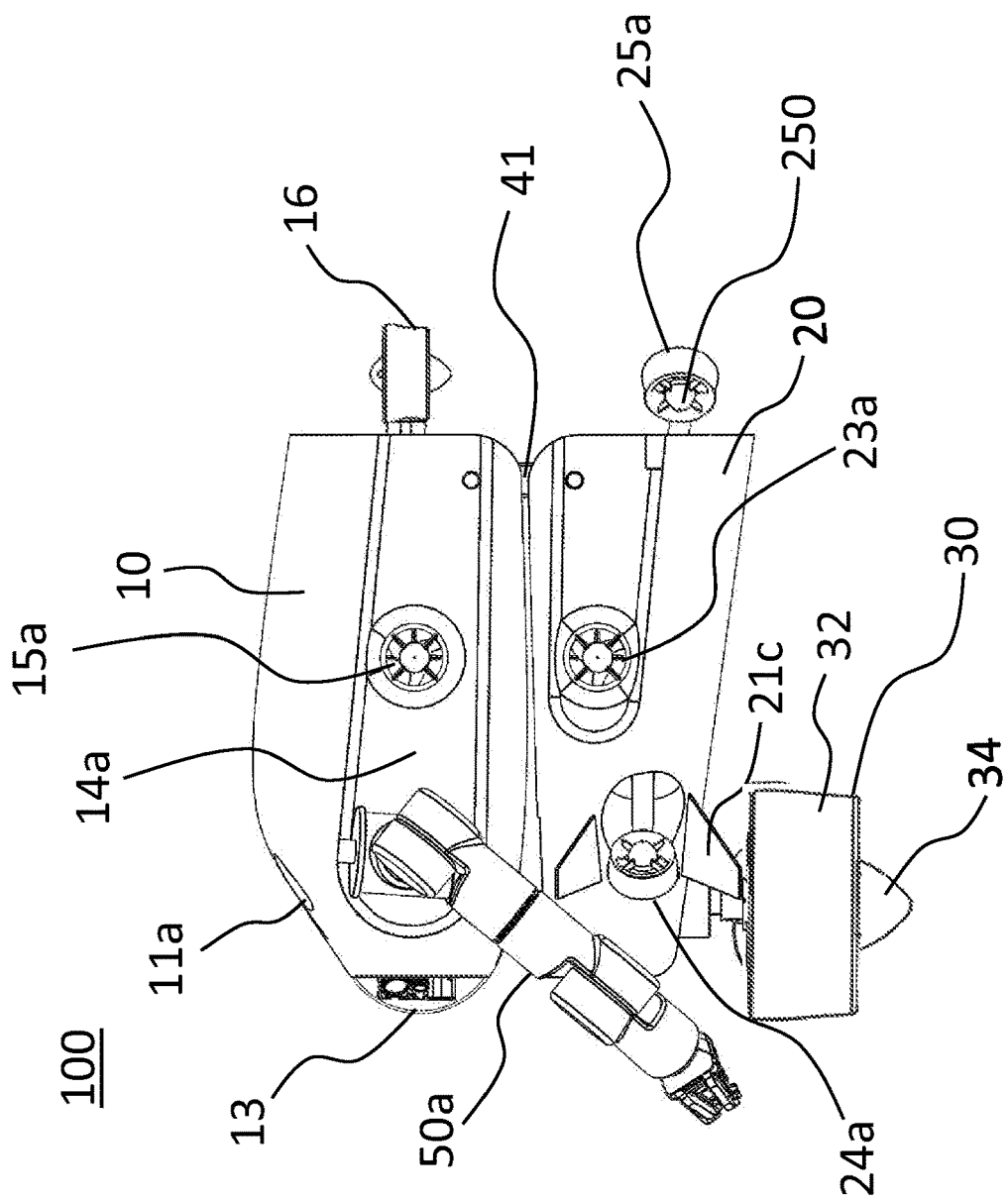
FIG. 12 shows a side view of a subsea robot with extended arms and thrusters in accordance with one or more embodiments of the present disclosure.
Figure 13:
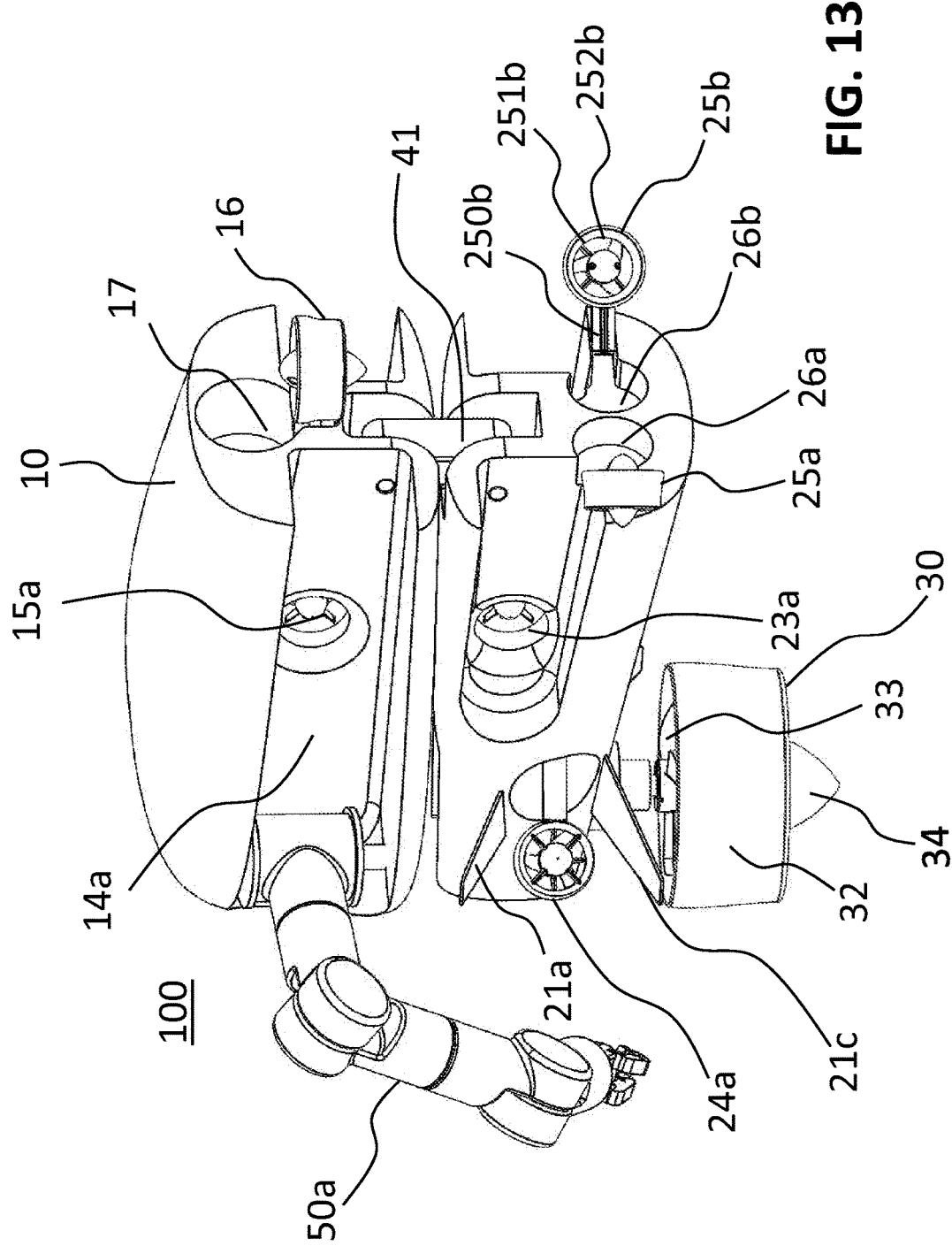
FIG. 13 shows a perspective view of a subsea robot with extended arms and thrusters in accordance with one or more embodiments of the present disclosure.
Figure 14:
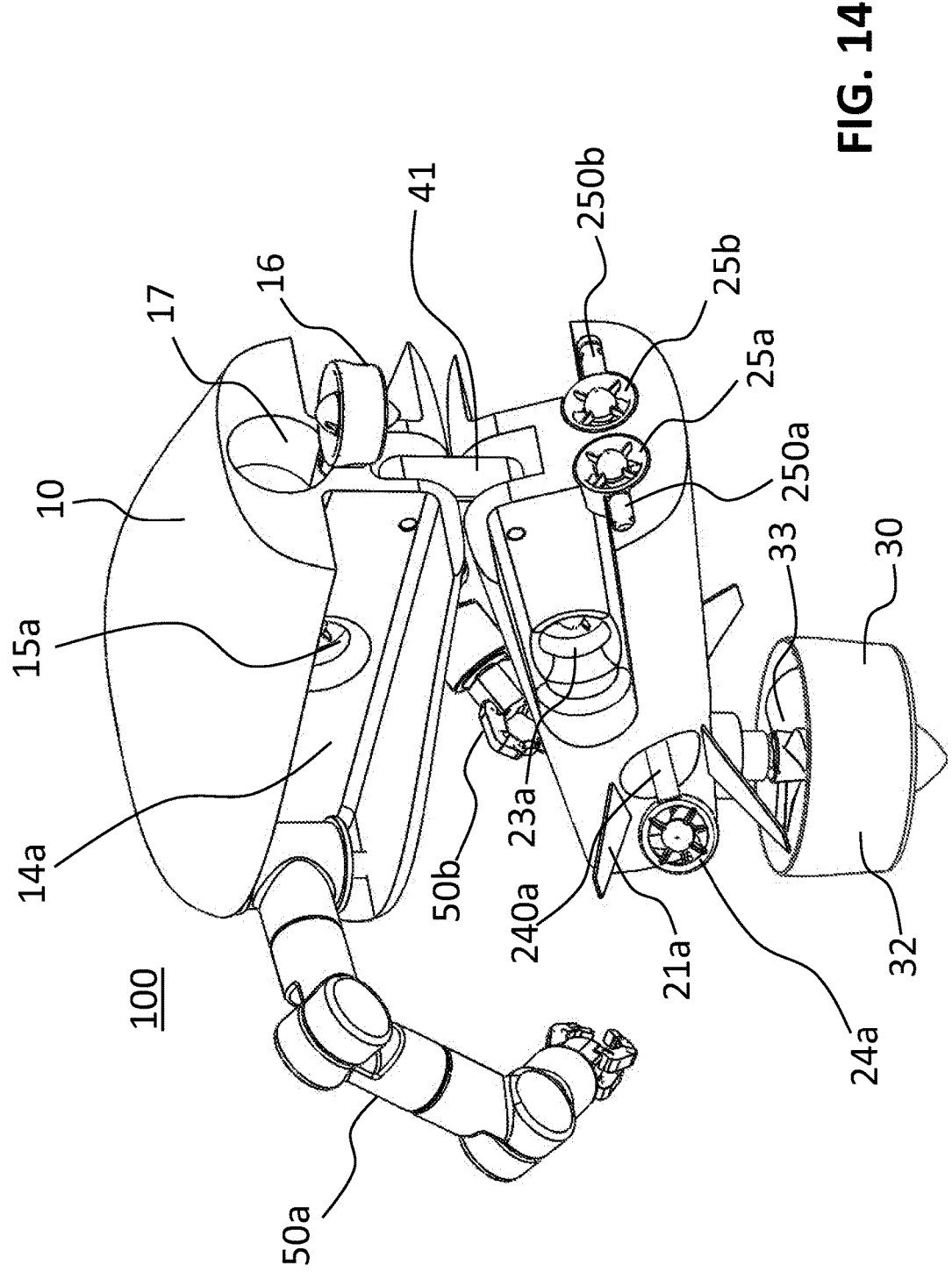
FIG. 14 shows a perspective view of a subsea robot with extended arms and thrusters in accordance with one or more embodiments of the present disclosure.
Figure 15:
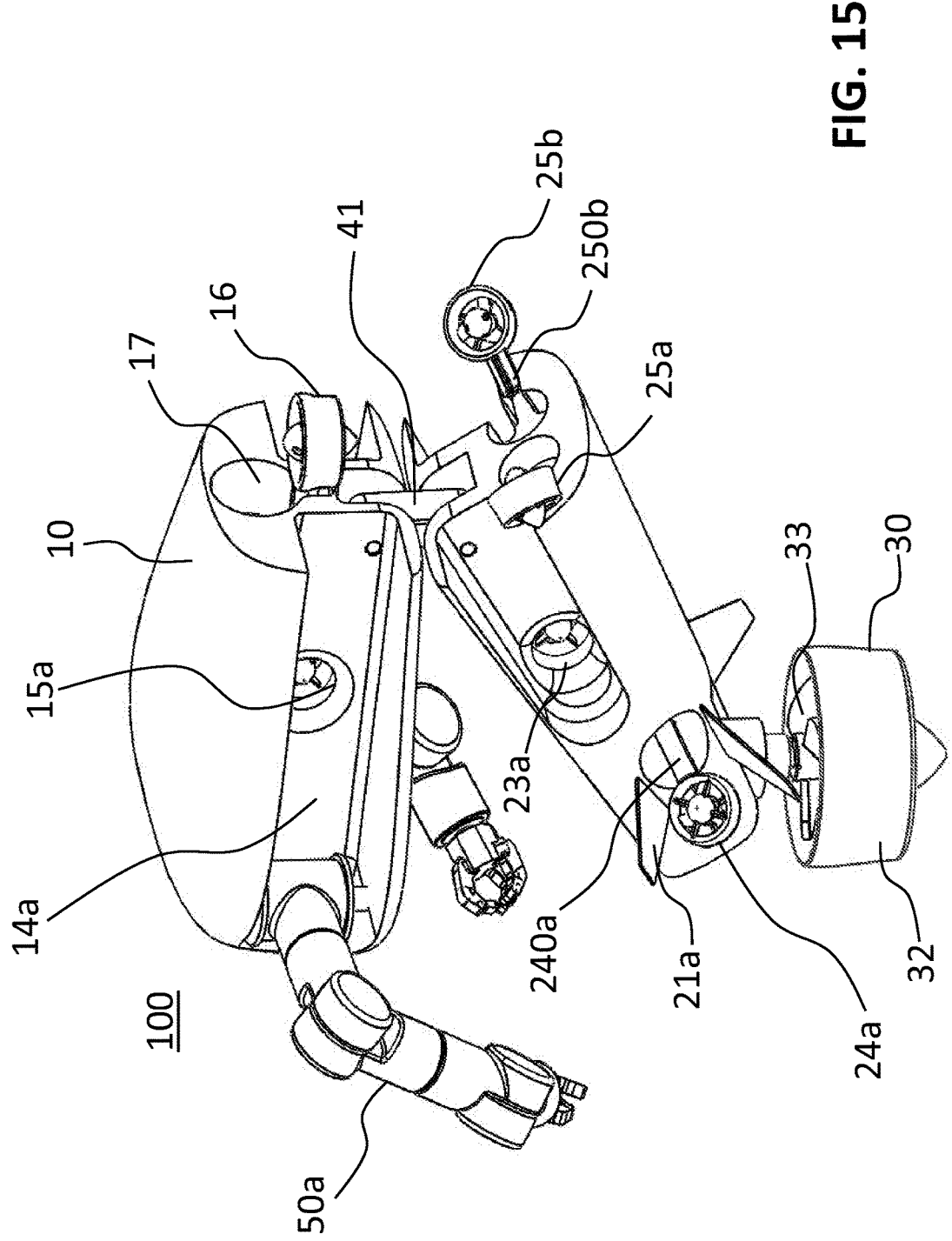
FIG. 15 shows a perspective view of a subsea robot with extended arms and thrusters in accordance with one or more embodiments of the present disclosure.
Figure 16:
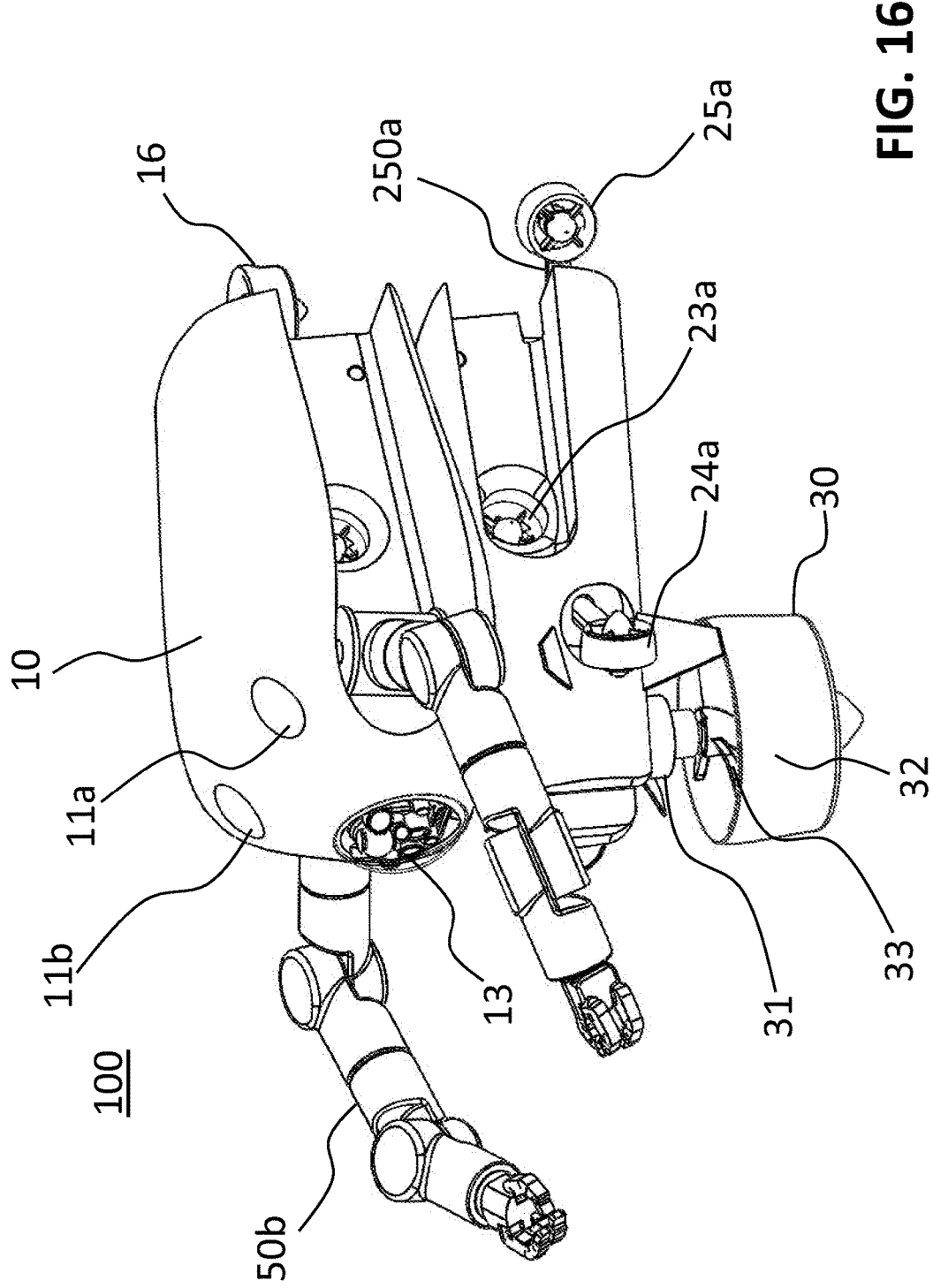
FIG. 16 shows a perspective view of a subsea robot with extended arms and thrusters in accordance with one or more embodiments of the present disclosure.
Figure 17:
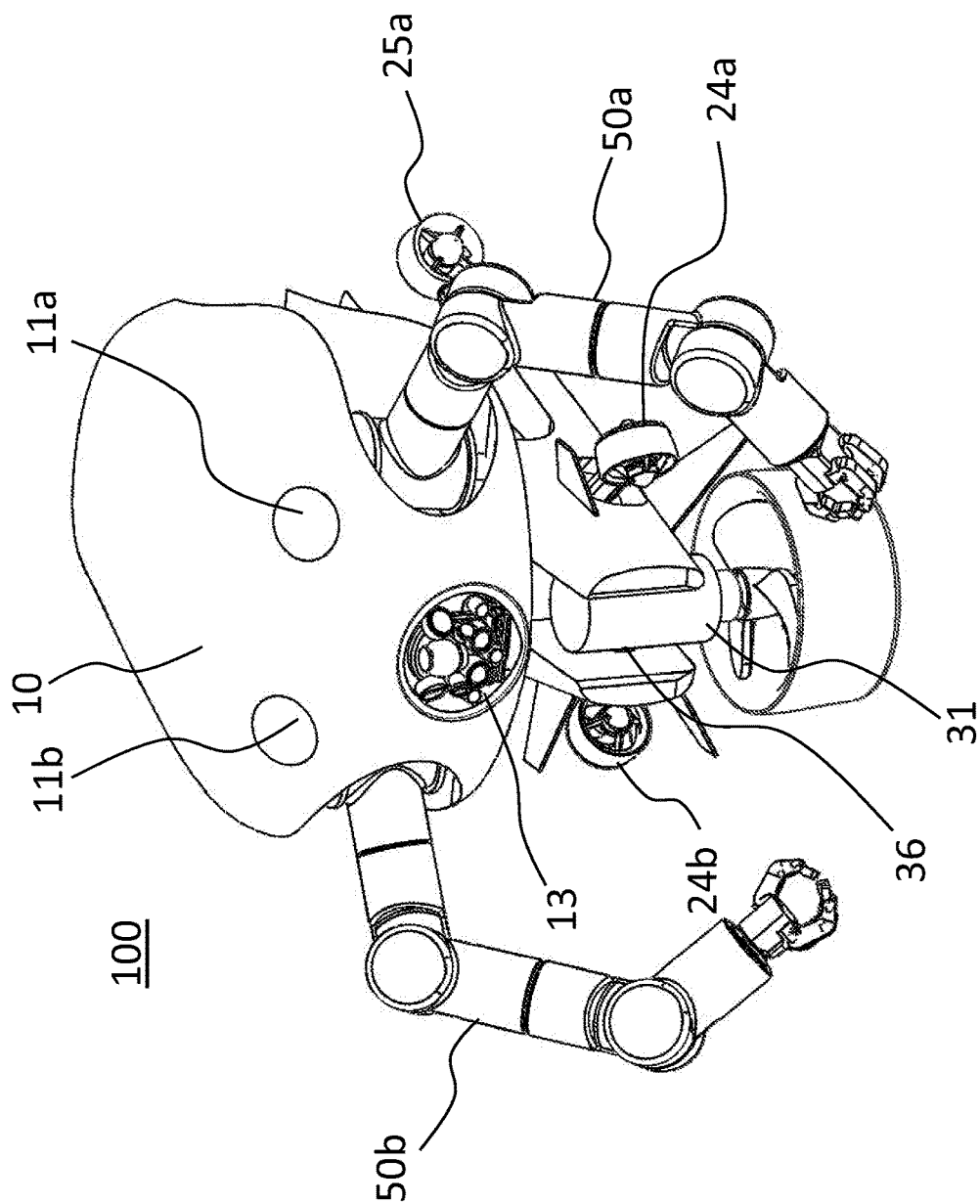
FIG. 17 shows a perspective view of a subsea robot with extended arms and thrusters in accordance with one or more embodiments of the present disclosure.

In accordance with one exemplary embodiment, the re-configurable body is transformable among the first configuration, the second configuration, and a third configuration such that in the third configuration an angle 42 of intersection of the longitudinal axis 18 of the head section 10 and the longitudinal axis 27 of the tail section 20 is different from an angle 42 of intersection of the longitudinal axis 18 of the head section 10 and the longitudinal axis 27 of the tail section 20 in the second configuration. For example, FIG. 10 shows the angle 42 of intersection of the longitudinal axis 18 of the head section 10 and the longitudinal axis 27 of the tail section 20 is different from the angle 42 in the first configuration and the second configuration. The transformation of the subsea robot 100 from the first configuration to the second configuration places the subsea robot 100 in the third configuration that is an intermediate configuration. The third configuration may also be configured for performing at least one robotic task in the subsea environment.

In accordance with one exemplary embodiment, the first configuration is a configuration in which the subsea robot 100 is hydrodynamically optimized for fast motion in underwater environment. The first configuration is also suitable for long range cruising underwater or underwater gliding. In the first configuration, the subsea robot 100 may ascend and descend vertically or horizontally, collecting oceanographic data along the way. In the first configuration, the subsea robot 100 may travel, for example, up to thousands of kilometers without a need for a recharge. In the first configuration, the subsea robot 100 may sample the underwater environment for chemical and physical characteristic.

In accordance with one exemplary embodiment, in the second configuration, the angle 42 between the head axis 18 and the tail axis 27 is less than 180 degrees, and the subsea robot 100 is configured to perform the underwater robotic operation with the plurality of robotic arms 50a, 50b extended without traveling in the subsea environment. In this configuration, the subsea robot 100 is transformed into a highly maneuverable platform that is precisely controlled and maneuvered underwater with the use of any of the plurality of deployable thrusters that are connected to the head section 10 and/or the tail section 20 of the subsea robot 100, for example, the plurality of head section side thrusters 15a, 15b; the head section back thruster 16; the plurality of tail section side thrusters 23a, 23b; the plurality of tail section retractable side thrusters 24a, 24b; the plurality of tail section retractable back thrusters 25a, 25b; or the main thruster 30. As used herein, "plurality of deployable thrusters" is meant to include any of the thrusters included in the subsea robot 100 configured for deployment when the re-configurable body is in any configuration other than the first configuration.

In an exemplary embodiment, at least one of the plurality of deployable thrusters of the subsea robot 100 are deployed in the first configuration to assist the subsea robot 100 with subsea travel. For example, one or more of the plurality of deployable thrusters may be deployed to assist the main thruster in propelling the subsea robot 100 or in thrust vectoring. As used herein, "thrust vectoring" is meant to include moving the subsea robot 100, manipulating a direction of a movement or produced thrust in order to control the attitude, or angular velocity of the subsea robot 100. Also, as used herein "moving" may refer to thrust vectoring.

In accordance with one exemplary embodiment, the second configuration may be referred to a configuration that is optimized for high maneuverability in a desired underwater location. A plurality of deployable thrusters are extended and employed by the subsea robot 100 for controlling the maneuverability of the subsea robot 100. For example, the plurality of tail section retractable back thrusters 25a, 25b include a plurality of retractable thruster connectors 250a, 250b such that the plurality of tail section retractable back thrusters 25a, 25b freely and controllably rotate around the plurality of retractable thruster connectors 250a, 250b to produce propelling force at any desired direction. A plurality of blades 252a, 252b rotate simultaneously or independent from each other to produce thrust. A plurality of blade housings 251a, 251b enclose the blade to protect the blade and any nearby objects from colliding with the rotating blades 252a, 252b and also increase thruster efficiency.

FIG. 13 to FIG. 18 show perspective and front views of a subsea robot with extended arms with extended head section back thruster, tail section retractable back thruster, and tail section retractable side thruster in accordance with one or more embodiments of the present disclosure. In this working configuration that include second configuration (FIGS. 13, 16, 17, and 18) and third configuration (FIGS. 14 and 15), the subsea robot 100 may be maneuvered using any of the plurality of deployable thrusters including the plurality of head section side thrusters 15a, 15b, the head section back thruster 16, the plurality of tail section side thrusters 23a, 23b, the plurality of tail section retractable side thrusters 24a, 24b, the plurality of tail section retractable back thrusters 25a, 25b, and/or the main thruster 30.

Figure 19:
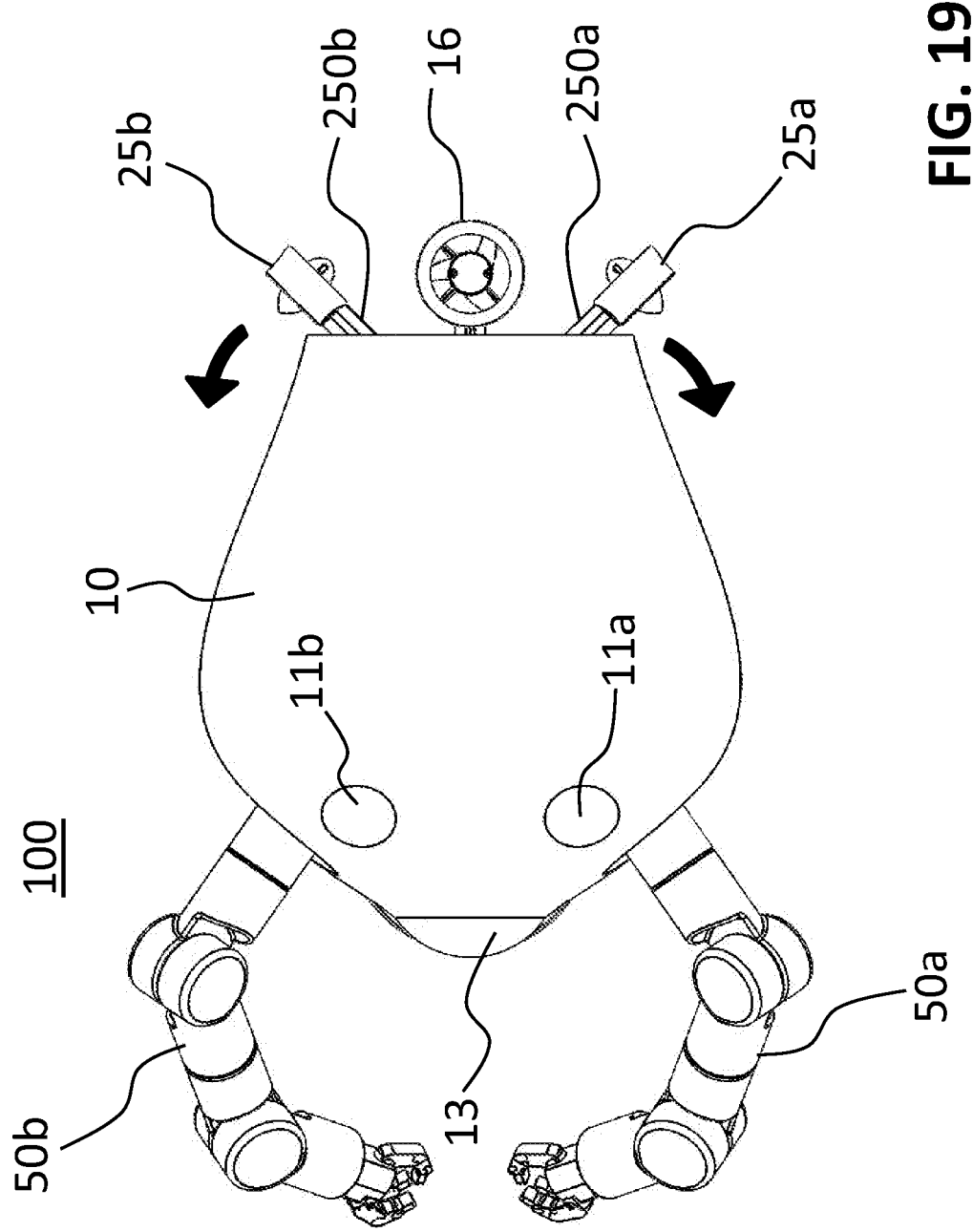
FIG. 19 shows a top view of a subsea robot with extended arms and thrusters in accordance with one or more embodiments of the present disclosure.

FIG. 19 shows a top view of a subsea robot with extended arms and shape-shifting position with extended head section back thruster and tail section retractable back thruster in accordance with one or more embodiments of the present disclosure. The plurality of tail section retractable back thrusters 25a, 25b that are connected to the tail section 20 via the plurality of retractable thruster connectors 250a, 250b freely and controllably rotate around the plurality of retractable thruster connectors 250a, 250b. In one exemplary embodiment, the tail section retractable back thrusters 25a, 25b are perpendicular to each other as shown in FIG. 19. In this exemplary embodiment, the thrust generated by the tail section retractable back thrusters 25a, 25b moves the subsea robot 100 clockwise or counter clockwise on the surface plane of FIG. 19 as shown by the two arrows. The head section back thruster 16 may move the subsea robot up or down (in and out of the surface plane of FIG. 19).

Figure 18:
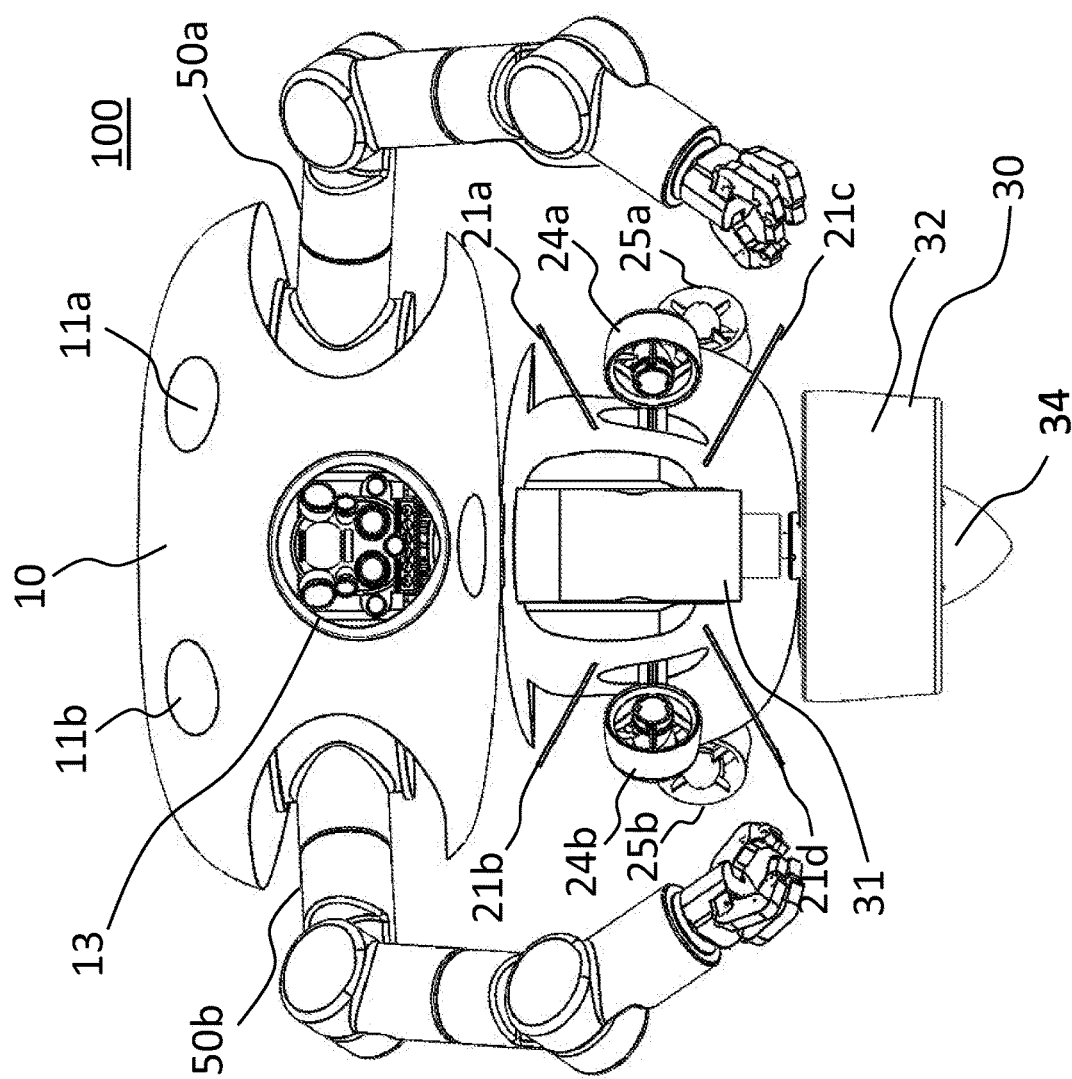
FIG. 18 shows a front view of a subsea robot with extended arms and thrusters in accordance with one or more embodiments of the present disclosure.

The plurality of the thrusters may produce various possible motions for the subsea robot. In one exemplary embodiment, the thrusters deployed in the subsea robot produce six, and/or up to six degree of freedom motion, degree of freedom motion being, for example, translation and rotation about three orthogonal axes. In one exemplary embodiment, four planar thrusters are oriented at 45 degrees to the forward/back axis to generate a combined net thrust in any direction on their plane or yaw about center axis. In one exemplary embodiment, by adding multiple vertical thrusters, it is possible to translate the subsea robot up or down and/or pitch forward or back with differential thrusting. In one exemplary embodiment, by adding a pair of thrusters opposed about the center axis, it is possible to translate the subsea robot left/right or create roll with differential thrusting. For example, FIG. 18 shows the four thrusters 24a, 24b, 25a, 25b that are near planar and oriented at 45 degrees to the forward/back axis. the four thrusters 24a, 24b, 25a, 25b produce translation forward/back and side to side, and yaw about the vertical axis. The thruster 16 in (as shown in, for example, FIG. 19) combined with the vertically oriented main thruster produce up/down translation or pitch rotation by thrusting differentially. The pair of thrusters 15a and 23a (as shown, for example, in FIG. 12) produce translation side to side or the "roll" rotation by thrusting differentially.

Figure 20:
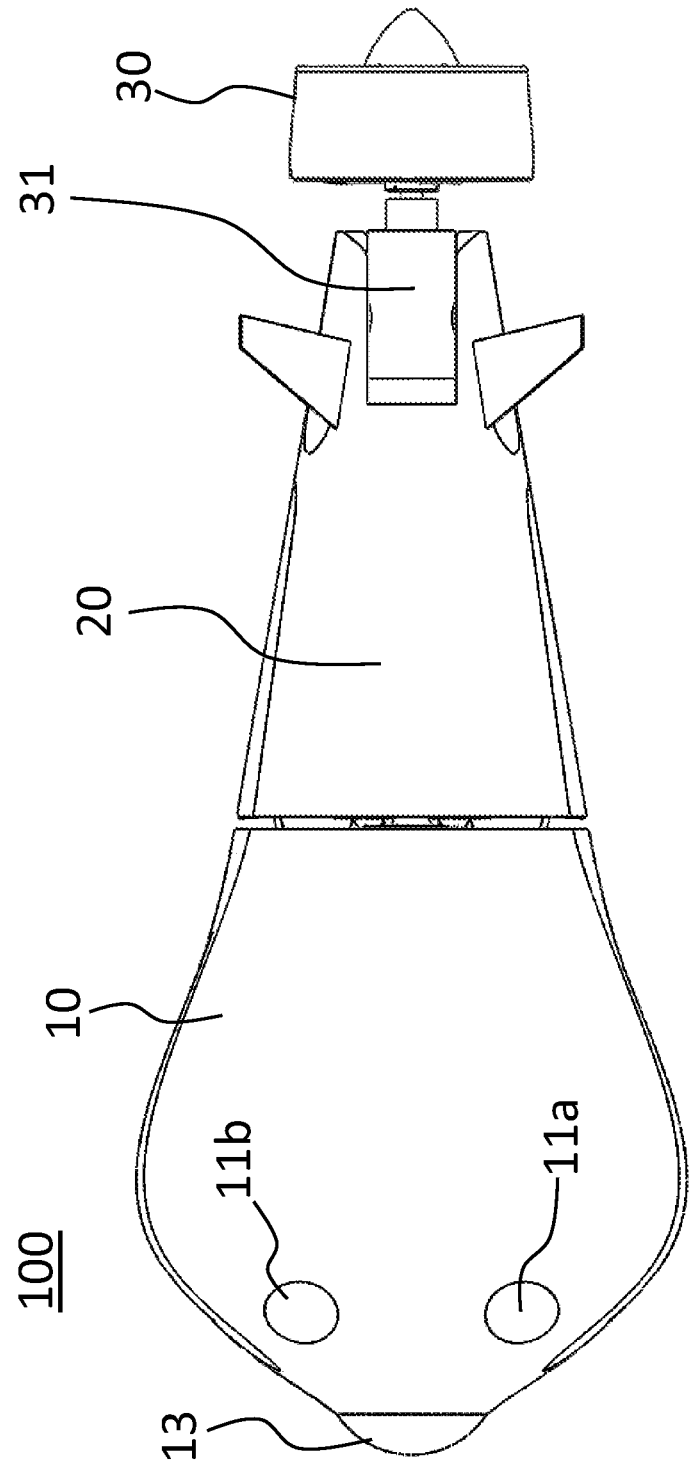
FIG. 20 shows a top view of a subsea robot with retracted arms and retracted thrusters in accordance with one or more embodiments of the present disclosure.

FIG. 20 shows a top view of a subsea robot with retracted arms in a straight position in accordance with one or more embodiments of the present disclosure. Transferring the subsea robot 100 back to the first configuration from the second configuration requires that the plurality of arms 50a, 50b, and plurality of deployable thrusters be retracted. Then, the main thruster 30 propels the subsea robot 100 at high speed for long-range cruising in the first configuration.

The subsea robot 100 may be operated in a supervised mode or an unsupervised mode, and may be capable of affordance-based, force-controlled dexterous manipulation at depths of up to, for example, 3,000 meters, and preferably, 10,000 meters. The re-configurable morphology of the subsea robot 100 allows for efficient long-range cruising and provides a highly maneuverable platform for manipulation intervention and inspection tasks. The subsea robot 100 (also referred to in the present disclosure as the subsea vehicle or the submersible robot) as well as a command and control architecture affords users the capability to perform complex tasks in connectivity-constrained conditions, such as those found in the subsea and deep ocean environment.

The subsea robot 100 generally performs conventional robotic tasks and also advances the type of robotics tasks that may be performed by subsea robots especially at a significant depth. The subsea robot with manipulation capability may be directly supported via a tether by a topside vessel using direct tele-operation and may utilize positional or rate-controlled hydraulic arms via joysticks that drive one axis at a time. The subsea robot may use an operator's direct HD camera view of the target. Multiple operators may jointly perform a single task with the subsea robot 100. The subsea robot 100 may work through a queue of preprogrammed, battery life prioritized, survey-only tasks.

The subsea robot 100 may be used for data gathering or manipulation of objects underwater. The subsea robot 100 may be optimized and limited to performing one mission or more than one mission in the first configuration or the second configuration. The subsea robot 100 may be used in long-range observation and data gathering missions, such as gathering oceanographic data, communication cable inspections, or subsea topographical surveys. The subsea robot 100 may be used in non-hovering, tetherless submarine-shaped hulls that is optimized for long-range cruising. The subsea robot 100 may be used for manipulation and tasks requiring high maneuverability, such as ship inspection.

The subsea robot 100 aimed at subsea manipulation may also be attached to topside support vessels for power and communication, providing advantages of high data rates and power-rich operation afforded by the tether. The subsea robot may be controlled by one or more operators. Hybrid operation of the subsea robot 100 between the first configuration and the second configuration provides a highly maneuverable platform that can perform manipulation work and also travel efficiently for up to thousands of kilometers. The subsea robot may be deployed from shore, off-shore platforms, or from other vehicle and may travel large distances, preferably up to thousands of kilometers, to perform manipulation or observation work or both.

In one exemplary embodiment, the subsea robot 100 is capable of transitioning from a first form or configuration suitable for efficient long-range cruising to a second form or configuration that is more appropriate and maneuverable for manipulation and performing robotic tasks. The subsea robot 100 may be a highly maneuverable, bifurcated manipulation platform with autonomy and power efficiency. The subsea robot 100 may have bi-manual electric manipulators that may be capable of force/torque control and a pair of end effectors. Any of the plurality of thrusters may be powered, for example, by variable flux electric motors that provide optimal efficiency. The subsea robot 100 may have re-configurable hull design and a streamlined hull capable of efficient long-range cruising. The subsea robot 100 may perform complex task execution without a high-bandwidth tether to the subsea robot 100 with a command and control architecture that may permit local command authority as well as a level of self-sufficiency to execute high-level, human-directed tasks that may decrease the mental burden required by a human operator.

Figure 21:
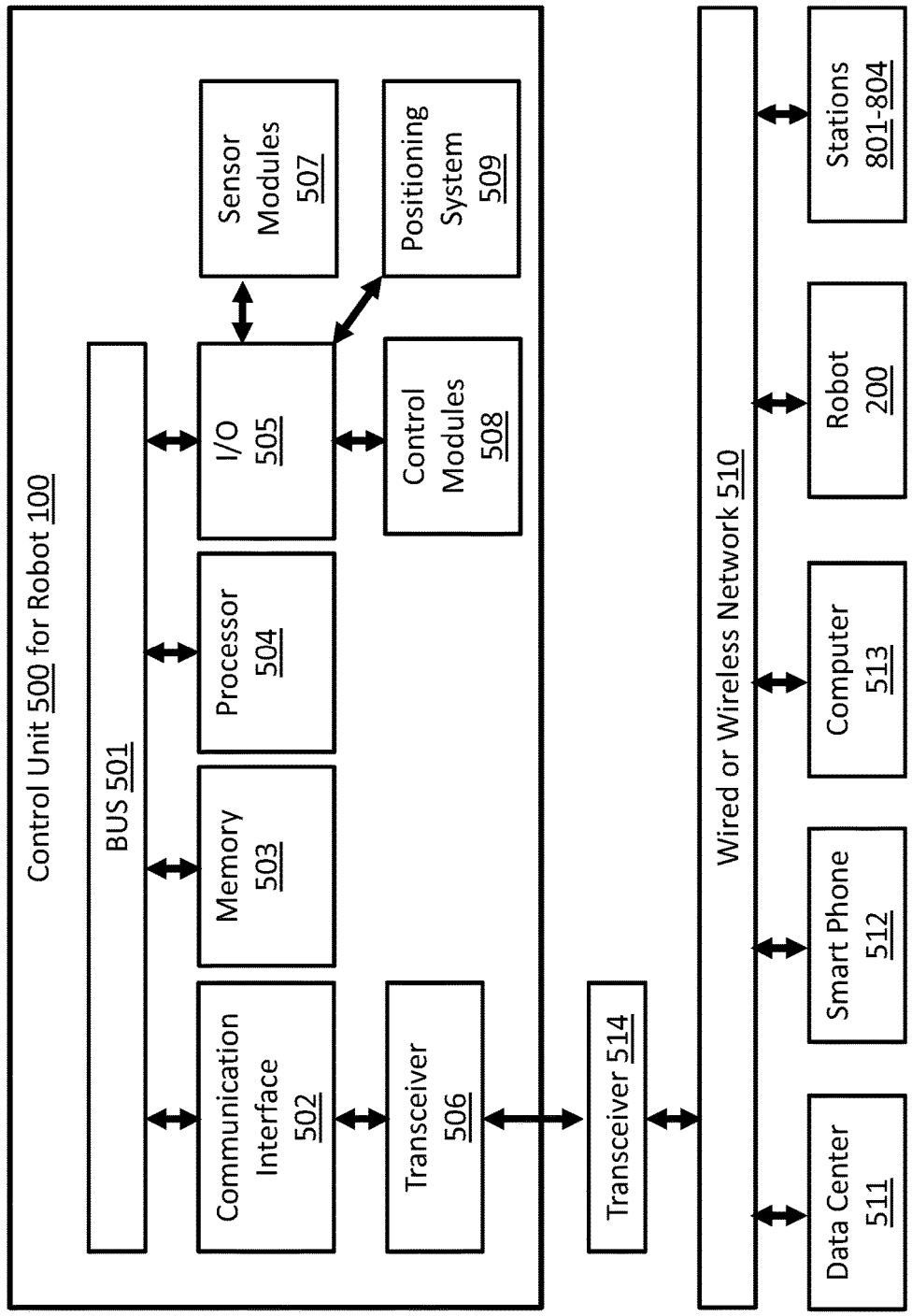
FIG. 21 shows a block diagram of control unit for a subsea robot in accordance with one or more embodiments of the present disclosure.

FIG. 21 shows a block diagram of control unit 500 for the subsea robot 100 in more detail upon which an embodiment of the present disclosure may be implemented. The subsea robot 100 may include one or more control units 500. The control unit 500 includes a bus 501 and/or other communication mechanisms for communicating information, and a processor 504 coupled to the bus 501 for processing the information. The control unit 500 also includes one or more memory units 503, such as a random access memory (RAM) or other dynamic storage device (e.g., dynamic RAM (DRAM), static RAM (SRAM), and synchronous DRAM (SDRAM)), coupled to the bus 501 for storing information and instructions to be executed by processor 504. In addition, the one or more memory units 503 may be used for storing temporary variables or other intermediate information during the execution of instructions by the processor 504. The control unit 500 may further include a read only memory (ROM) 503 or other static storage device (e.g., programmable ROM (PROM), erasable PROM (EPROM), and electrically erasable PROM (EEPROM)) coupled to the bus 501 for storing static information and instructions for the processor 503.

The control unit 500 may further include a communication interface 502 coupled to the bus 501. The communication interface 502 provides a two-way data communication coupling to one or more transceivers 506. For example, the communication interface 502 may be a network interface card to attach to any packet switched LAN. As another example, the communication interface 502 may be an asymmetrical digital subscriber line (ADSL) card, an integrated service digital network (ISDN) card or a modem to provide a data communication connection to a corresponding type of communications line. Underwater wireless links may also be implemented. In any such implementation, the communication interface 502 sends and receives electrical, electromagnetic, and/or optical signals that carry digital data streams representing various types of information. The control unit 500 may further include a plurality of I/O ports 505 that transmit and/or receive signals from sensor modules 507, control modules 508, and positioning system 509 of the subsea robot 100.

The transceiver 506 typically provides data communication through one or more networks to other data devices via a second transceiver 514. For example, the transceiver 506 may provide a connection to the data center 511 or the smart phone 512 through a network 510 or through equipment operated by a service provider, which provides communication services through the network 510. The network 510 uses, for example, electrical, electromagnetic, and/or optical signals that carry digital data streams, and the associated physical layer (e.g., CAT 5 cable, coaxial cable, optical fiber, etc.). The signals through the various networks and the signals on the network 510 and through transceiver 506, which carry the digital data to and from the control unit 500 maybe implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase, and/or frequency shift-keyed signals that are propagated over a conductive media and water, and/or transmitted as electromagnetic, magnetic, and/or acoustic waves through a propagation medium, such as sea water. Thus, the digital data may be sent as unmodulated baseband data through a "wired" communication channel and/or sent within a predetermined frequency band, different from baseband, by modulating a carrier wave.

Figure 22:
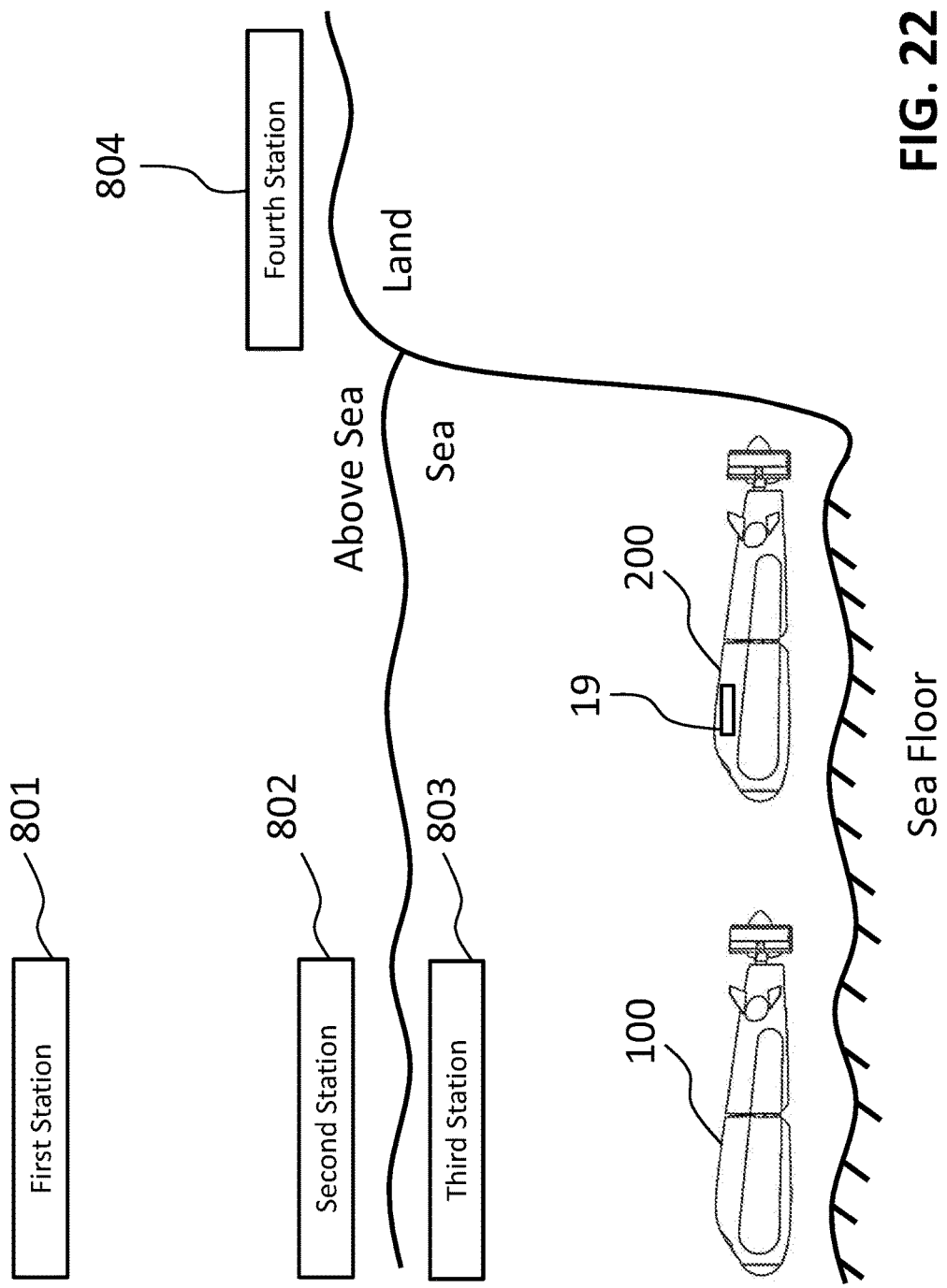
FIG. 22 shows communication among various stations and a plurality of subsea robots in accordance with one or more embodiments of the present disclosure.

In one exemplary embodiment, the transceiver 506 may communicate with at least one transceiver 514 that is located outside of the subsea robot 100. The communication between the transceiver 506 and 514 may be wired or wireless underwater communication, for example, optical communication, electromagnetic communication, magnetic communication, and/or acoustic communication. The at least one transceiver 514 may be connected to a wired or wireless network 510. The wired or wireless network 510 may be connected to the Internet. The wired or wireless network 510 may further be connected to a data center 511 that receives and stores data from the control unit 500, one or more smart phones 512 or one or more computers 513 that provide one or more operators and/or users a platform to communicate with the control unit 500 and/or observe the subsea robot 100. Additionally, the wired or wireless network 510 may be connected to one or more other subsea robots 200, as shown in FIG. 22, to provide a communication route between one or more subsea robots 100, 200. The wired or wireless network 510 may further be connected to a plurality of base stations 801-804.

FIG. 22 shows communication among various stations and a plurality of subsea robots 100, 200 in accordance with one or more embodiments of the present disclosure. The plurality of subsea robots 100, 200 may communicate directly to each other to send and receive data among them. Alternatively, the plurality of subsea robots 100, 200 may communicate with the plurality of base stations 801-804. The plurality of base stations 801-804 may be located undersea, above sea on a topside vehicle and/or vessel, a satellite control station, and/or on the land. The plurality of base stations 801-804 may also be part of a network, where communication is performed among the base stations 801-804 and the subsea robots 100, 200 via wired or wireless network.

The undersea robot 100 may be an electrically powered robot and may include an on-board power source 19, such as a battery-powered or fuel-cell-powered robot. Alternatively, the undersea robot may be powered by alcohol-based fuels, fossil fuels, and/or any other type of fuels. The on-board power source 19 may be located on any section of the subsea robot 100 such as the head section 10 and/or the tail section 20. Alternatively, the subsea robot may be connected to a topside vessel via wires to provide communication and power.

Figure 23:
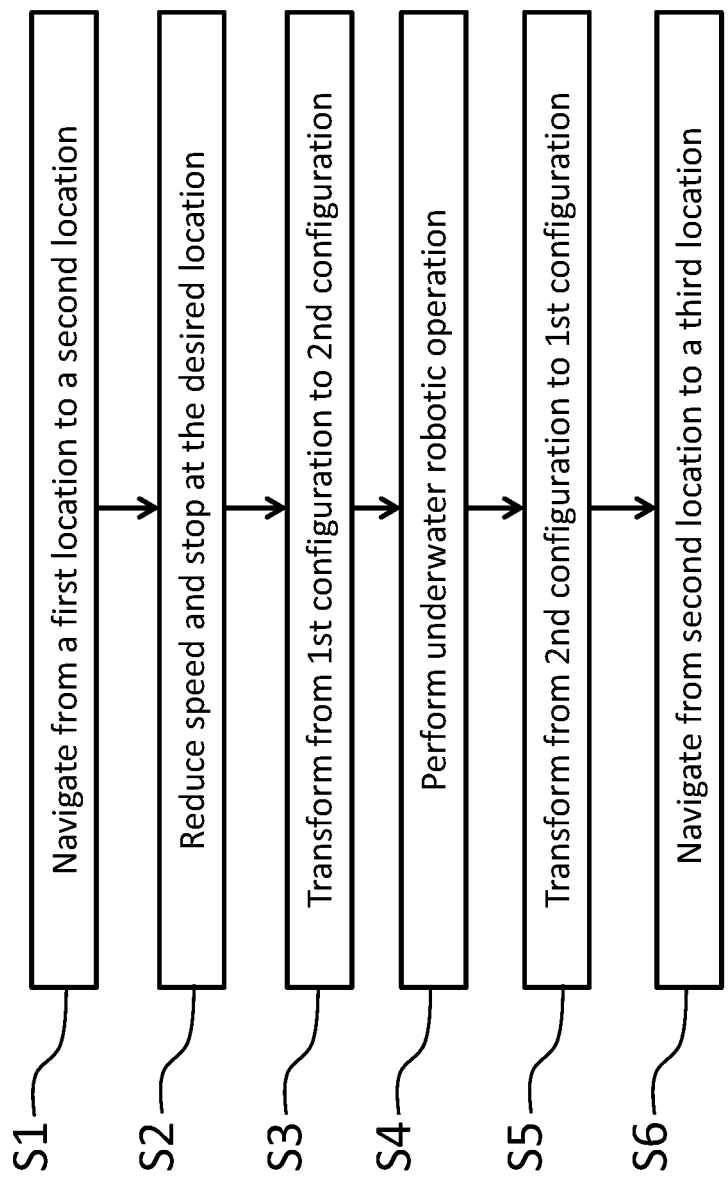
FIG. 23 shows a flowchart of a method for operating a subsea robot in accordance with one or more embodiments of the present disclosure.

FIG. 23 shows a flowchart of a method for operating a subsea robot in accordance with one or more embodiments of the present disclosure. In one exemplary method of operating the subsea robot 100, in the step S1, the subsea robot navigates from a first location to a second location. The navigation and/or the travel is performed at high speed of up to 100 Km/hr. The subsea robot 100 is in the first configuration when traveling at high speed at step S1, the first configuration being hydro-dynamically optimized for long-range cursing. While navigating, the subsea robot 100 may continuously report its location to a base station or an operator via the control unit 500. Upon determination that the subsea robot 100 is at proximity of the desired location or the second location, the speed of the subsea robot 100 is reduced at step S2. The determination may be based on a predetermined geographical location or may be based on real-time survey of the underwater environment. Alternatively, electromagnetic, magnetic, and/or acoustic signals from the desired or the second location may be submitted to the subsea robot 100 as an indication that the subsea robot 100 is at a proximity of the desired or the second location.

The subsea robot 100 stops at the desired or the second location and starts the transformation process, at step S3, to transform itself from the first configuration to the second configuration, the second configuration being a configuration in which the subsea robot 100 is suitable to perform one or more robotic tasks with extended robotic arms. The transformation process may be automatic and/or pre-programmed into the control unit 500 of the subsea robot 100. The transformation process may be remotely controlled and operated by at least one operator. Alternatively, the transformation may be a hybrid process where part of the process is pre-programmed and part of the process is conducted by at least one operator.

At step S4, the subsea robot 100 conducts the required robotic tasks at the desired or the second location. The robotic tasks may be conducted by a remote operator. During the performance of the robotic tasks, any of the plurality of thrusters may be actuated to aid accurate positioning of the subsea robot 100, or may be actuated to provide force to hold in place the subsea robot 100. While conducting the robotic tasks, one or more cameras may broadcast the video in real-time, which may be HD video, to one or more operators.

Upon completion of the robotic task, the subsea robot 100, at step S5, is transformed from the second configuration to the first configuration. The transformation process may be automatic and pre-programmed into the control unit of the subsea robot 100. The transformation process may be remotely controlled and operated by one or more operators. Alternatively, the transformation process may be a hybrid process where part of the process is pre-programmed and part of the process is conducted by one or more operators.

After transferring to the first configuration, the subsea robot 100, at step S6, may navigate away from the desired or the second location to a third location for charging, for surveying, and/or for performing other robotic tasks. Alternatively, the subsea robot 100 may navigate to a charging station when it plugs itself to the charging station for charging.

One person of ordinary skill in the art will understand that the subsea robot 100, as disclosed herein, may include additional components or segments in addition to the head section 10 and the tail section 20. For example, in an exemplary embodiment, the subsea robot 100 may include three sections or segments: a head section 10, a tail section 20, and a torso section. In other embodiments, the subsea robot may include at least three, at least four, at least five, at least six segments. In other embodiments, the subsea robot may include up to ten or hundred sections or segments that are connected to each other. Yet, in another exemplary embodiment, the head section 10 and/or the tail section 20 may include two or more sub-segments that are connected to each other. The connected sub-segments may be permanently fixed with the joint or may be moved around the joint. The segments or section of the re-configurable body may be pivotally connected to each other using a plurality of pivot joints. In other exemplary embodiments, the segments or section of the re-configurable body, such as a head section and a tail section may slide over each other or into each other.

Figure 24:
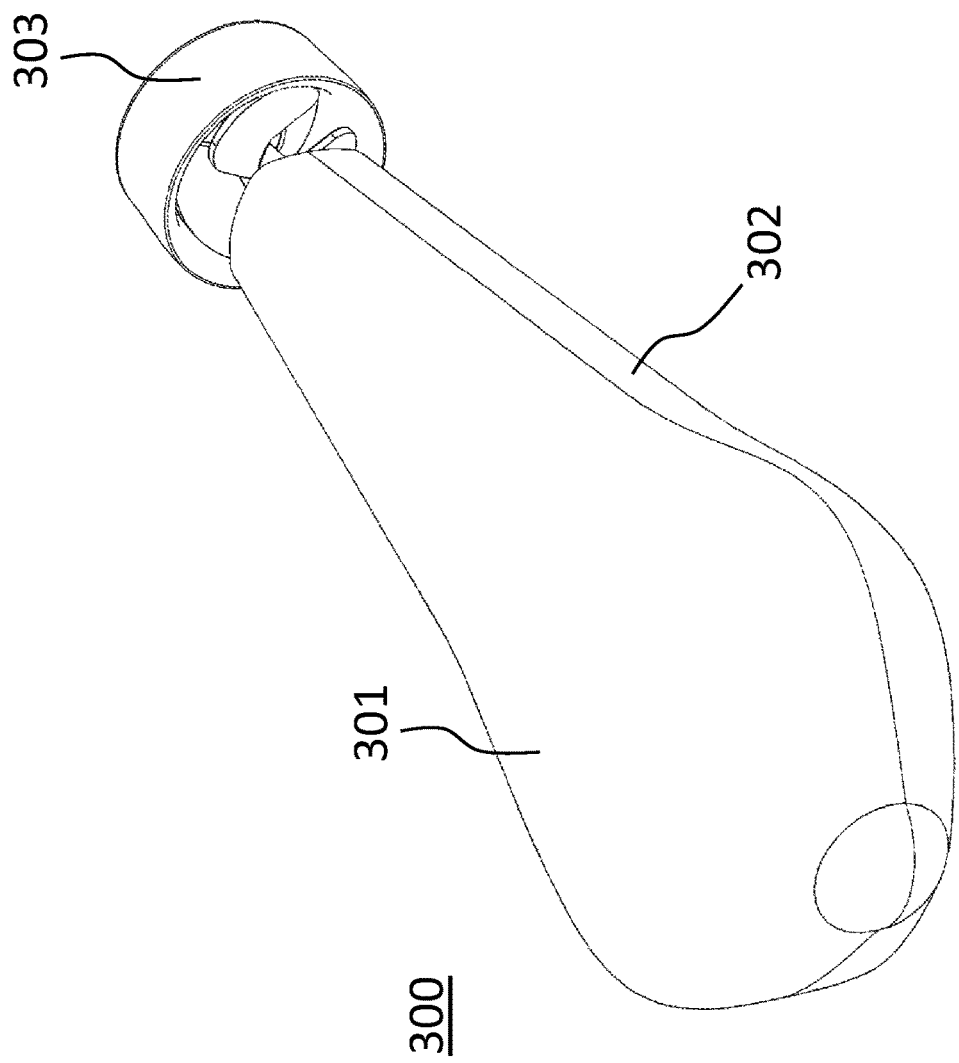
FIG. 24 shows a perspective view of a subsea robot in accordance with one or more embodiments of the present disclosure.
Figure 25:
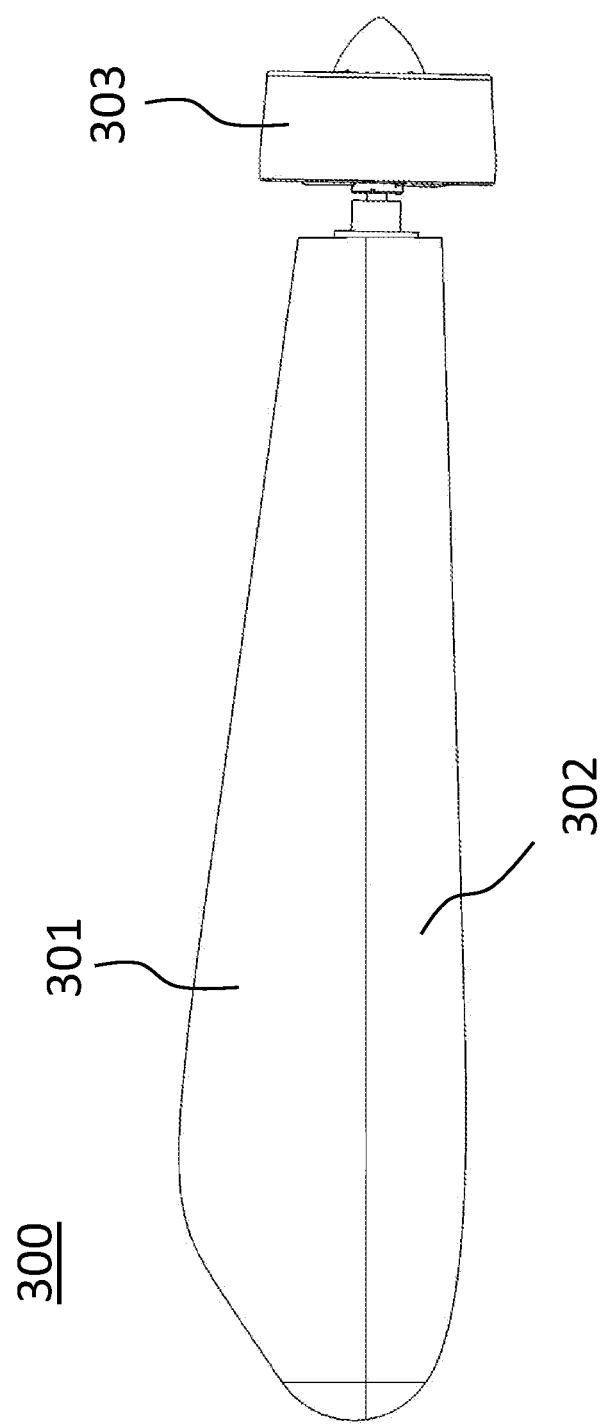
FIG. 25 shows a side view of a subsea robot in accordance with one or more embodiments of the present disclosure.

FIG. 24 and FIG. 25 respectively show perspective and side views of a subsea robot 300 in accordance with another embodiment of the present disclosure. In this exemplary embodiment, the subsea robot 300 includes a re-configurable body including a top shell section 301 and a bottom shell section 302 that transforms between two or more configurations, for example a first configuration and a second configuration, via a clam-shell mechanism. FIG. 24 and FIG. 25 show the subsea robot 300 including at least one main thruster 303 in the first configuration. In the first configuration, the subsea robot 300 has an elongated, hydrodynamic shape, for example, a shape that is similar to a torpedo, to produce minimum friction when the subsea robot 300 travels efficiently under water at high speed and/or for long distances. In the first configuration, the main thruster 303 produces a thrust that propels the subsea robot 300 forward generally along a longitudinal axis of the hydrodynamic shape. In the first configuration, a plurality of arms 304a and 304b, and/or a plurality of thrusters 305a, 305b, and 305c (shown in FIG. 26 and FIG. 27) are housed inside and contained in-between the top shell section 301 and the bottom shell section 302 of the subsea robot 300. A variety of different sensors modules, electronics and control modules, communication modules, power modules, and/or batteries, may also be housed in-between the top shell section 301 and the bottom shell section 302 of the subsea robot 300.

Figure 26:
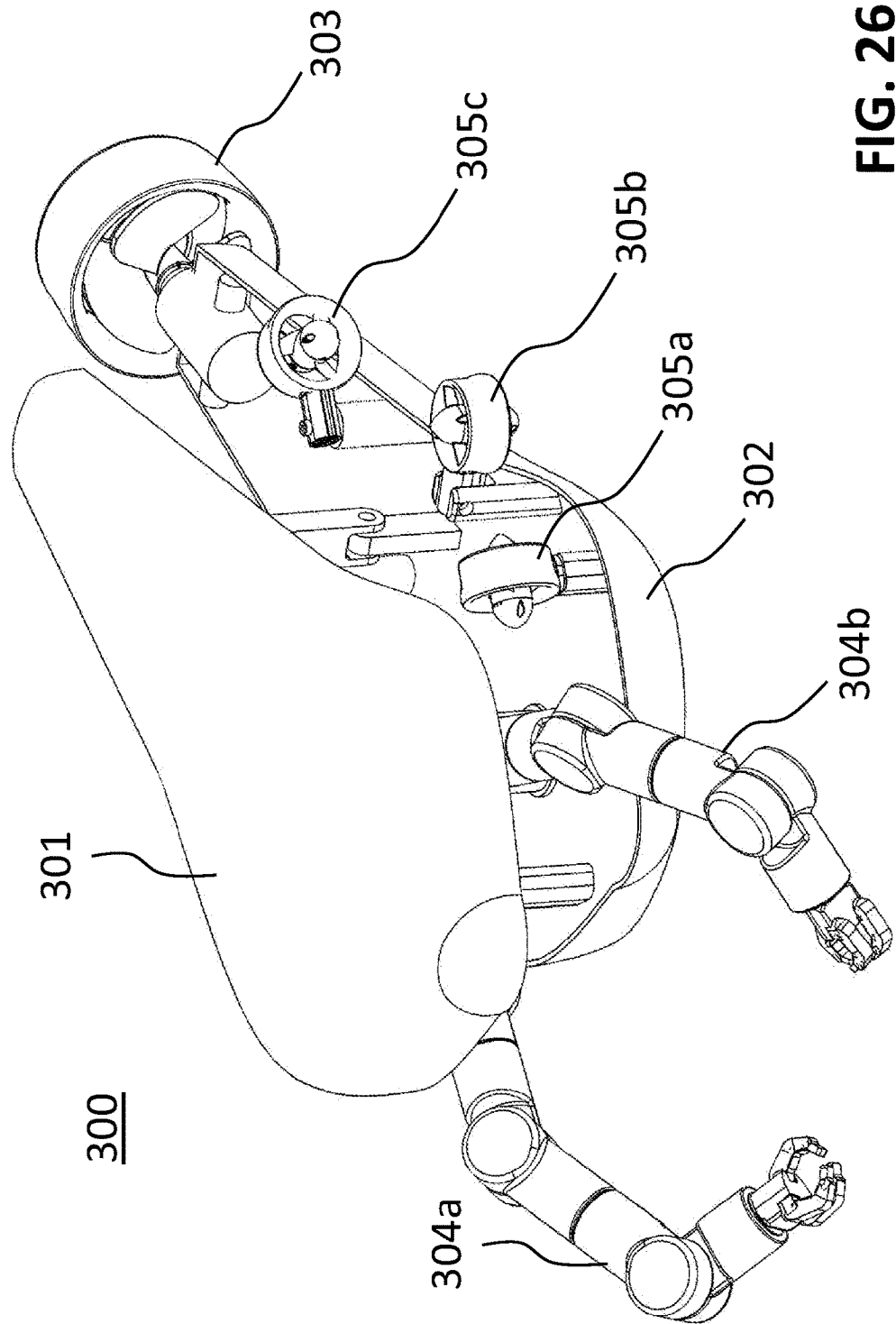
FIG. 26 shows a perspective view of a subsea robot with extended arms in accordance with one or more embodiments of the present disclosure.
Figure 27:
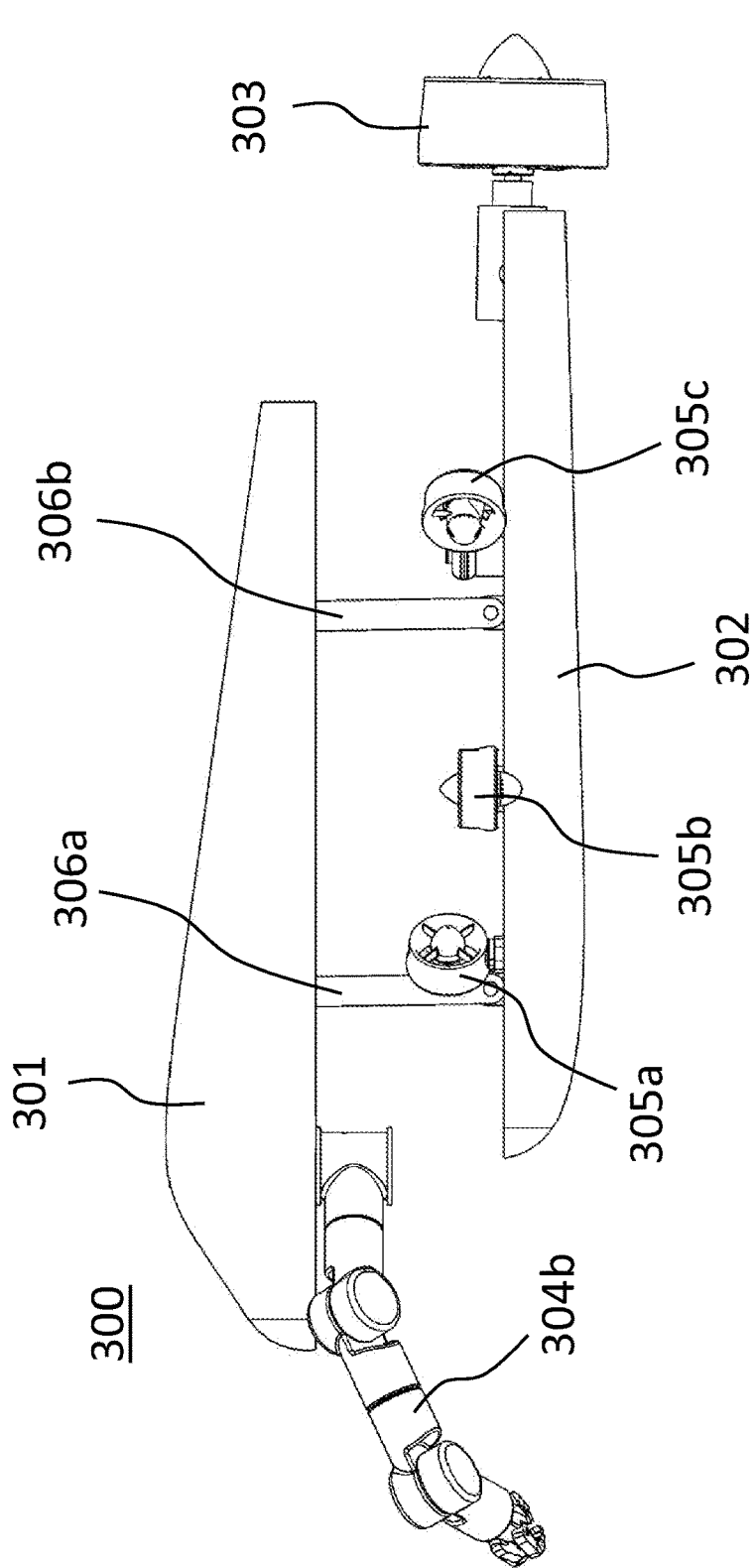
FIG. 27 shows a side view of a subsea robot with extended arms in accordance with one or more embodiments of the present disclosure.

FIG. 26 and FIG. 27 respectively show perspective and side views of a subsea robot 300 with extended arms in accordance with another embodiment of the present disclosure. FIG. 24 and FIG. 25 show the subsea robot 300 including the at least one main thruster 303 in the second configuration such that the top shell section 301 and the bottom shell section 302 of the subsea robot 300 are connected to each other by a plurality of pivotable connectors 306a and 306b to transform the subsea robot 300 between two or more configurations, including the first and the second configuration, via the clam-shell mechanism. The clam-shell mechanism of the subsea robot 300 results in movement of the top shell section 301 and the bottom shell section 302 of the subsea robot 300 around the plurality of pivotable connectors 306a and 306b, and therefore, results in a change in the overall shape of the subsea robot 300. The re-configurable body of the subsea robot 300, in the second configuration, has a shape configured for performing at least one robotic task in the subsea environment. In the second configuration, a plurality of arms 304a and 304b, and/or a plurality of thrusters 305a, 305b, and 305c are extended to perform task related to the second configuration as described in the present disclosure.

Figure 28:
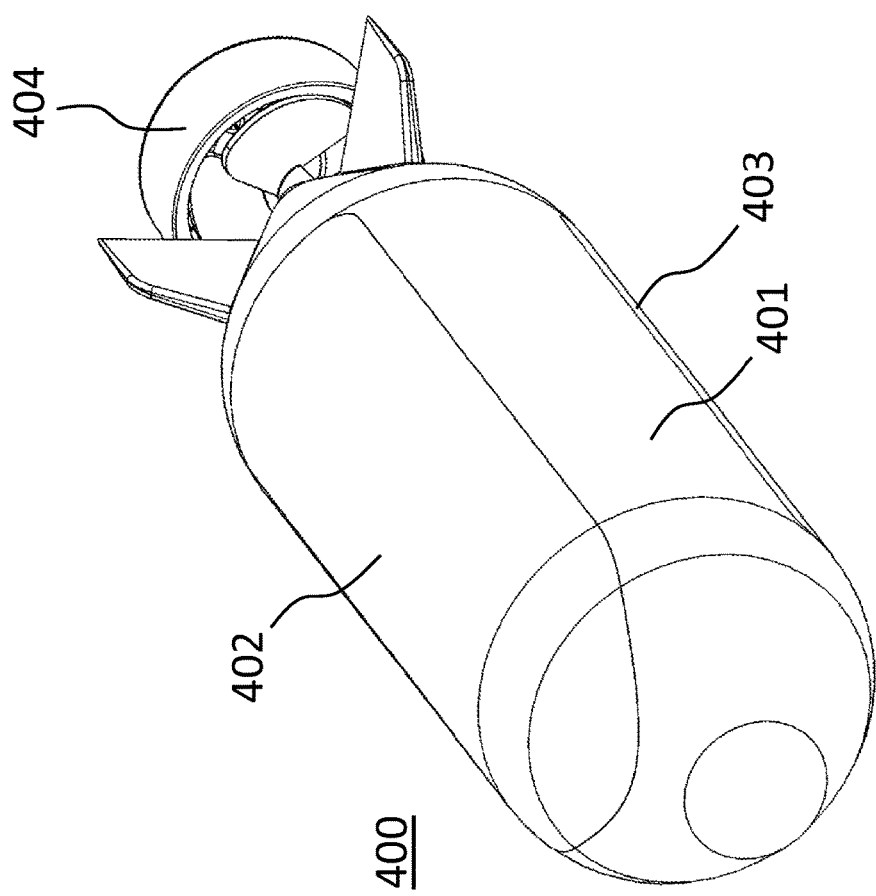
FIG. 28 shows a perspective view of a subsea robot in accordance with one or more embodiments of the present disclosure.
Figure 29:
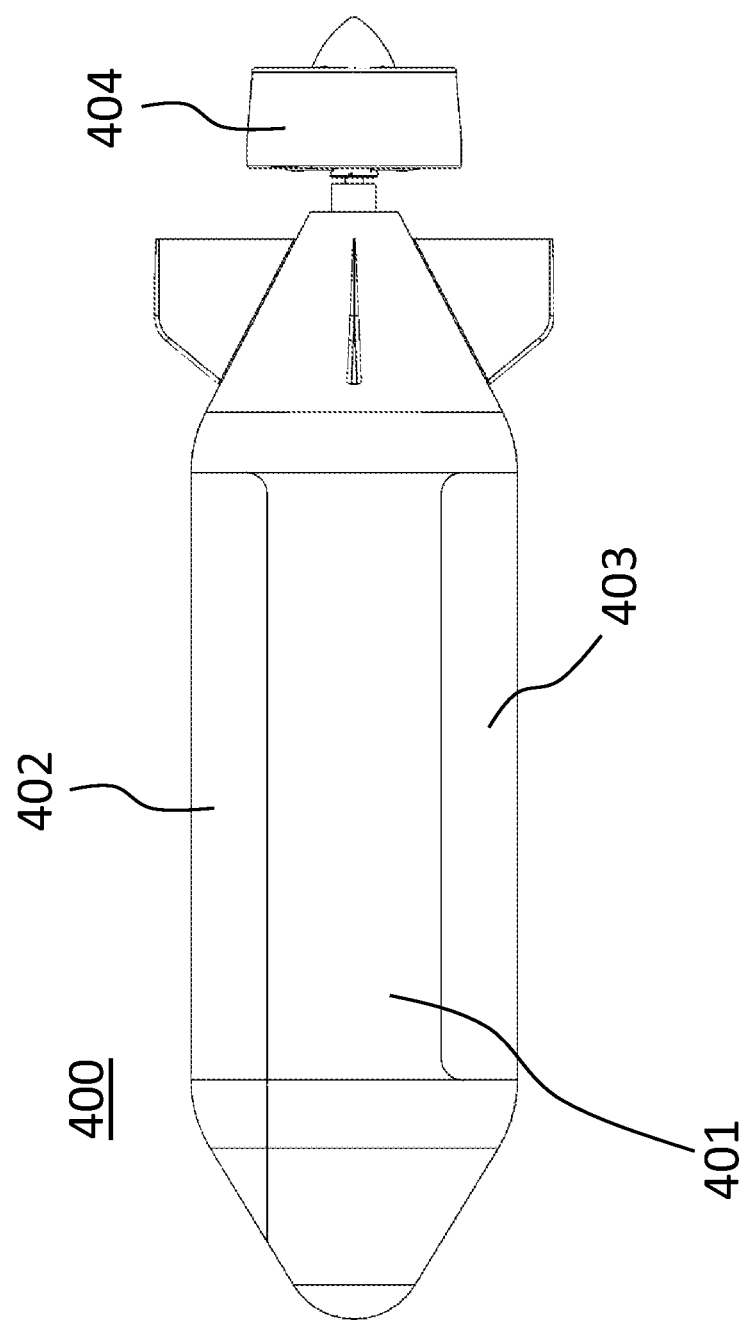
FIG. 29 shows a side view of a subsea robot in accordance with one or more embodiments of the present disclosure.

FIG. 28 and FIG. 29 respectively show perspective and side views of a subsea robot 400 in accordance with yet another embodiment of the present disclosure. In this exemplary embodiment, the subsea robot 400 includes a re-configurable body including at least one top retractable component 402 and at least one bottom retractable component 403 that are connected to a middle body 401. The top retractable component 402 and the bottom retractable component 403 are extended and retracted to transform between two or more configurations, for example a first configuration and a second configuration. FIG. 24 and FIG. 25 show the subsea robot 400 including at least one main thruster 404 in the first configuration. In the first configuration, the subsea robot 400 has an elongated, hydrodynamic shape, for example, a shape that is similar to a torpedo, to produce minimum friction when the subsea robot 400 travels efficiently under water at high speed and/or for long distances. In the first configuration, the main thruster 404 produces a thrust that propels the subsea robot 400 forward generally along a longitudinal axis of the hydrodynamic shape. In the first configuration, a plurality of arms 406a and 406b, and/or a plurality of thrusters 407a to 407e (shown in FIG. 26 and FIG. 27) are housed inside the middle body 401 and contained in-between the top retractable component 402 and the bottom retractable component 403 of the subsea robot 400. A variety of different sensors modules, electronics and control modules, communication modules, power modules, and/or batteries, may also be housed inside the middle body 401 of the subsea robot 300. The top retractable component 402 and the bottom retractable component 403 of the subsea robot 400 may be extended simultaneously, with time delay, based on specific task that will be performed, or based on the mission requirement.

Figure 30:
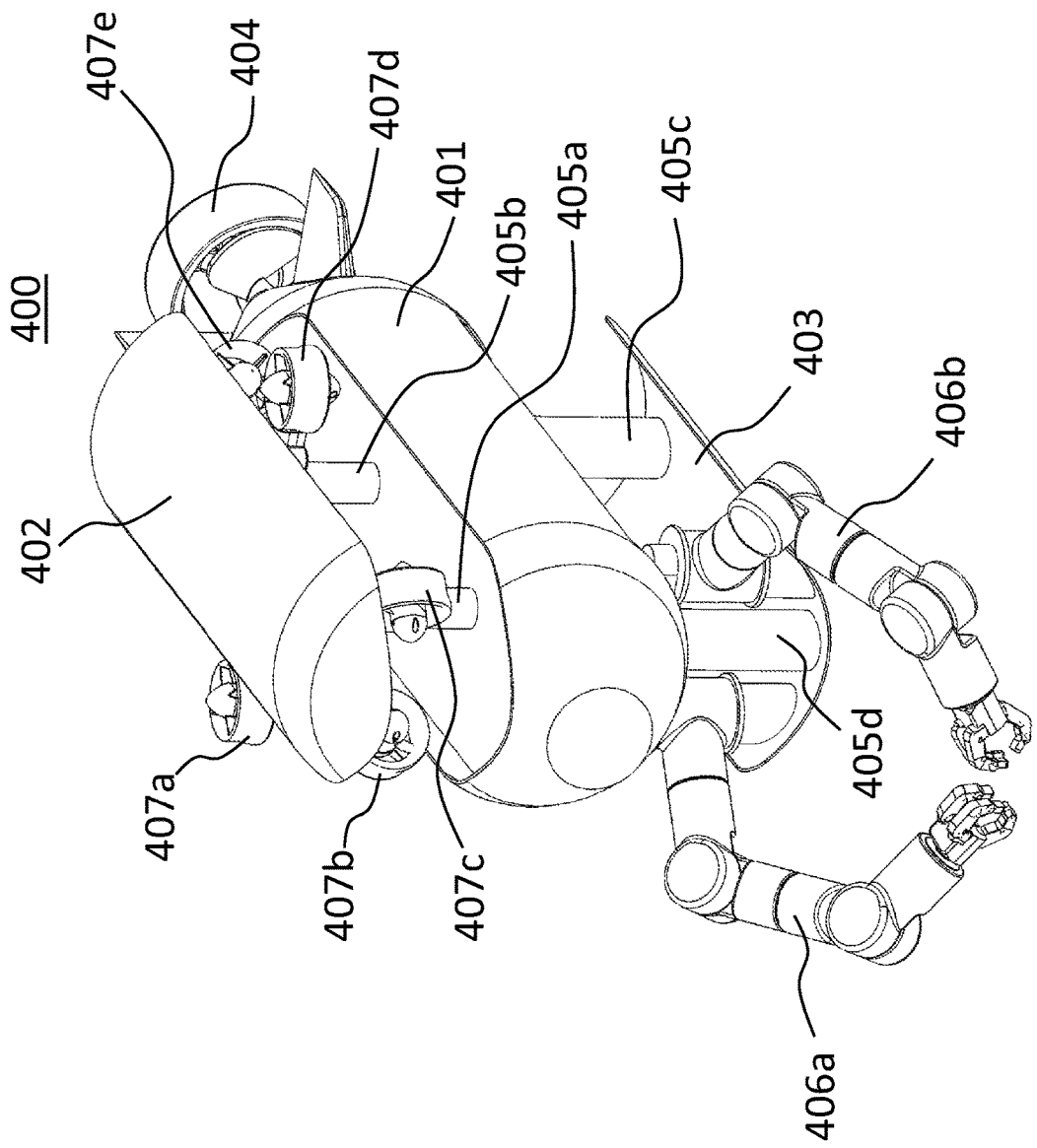
FIG. 30 shows a perspective view of a subsea robot with extended arms in accordance with one or more embodiments of the present disclosure.
Figure 31:
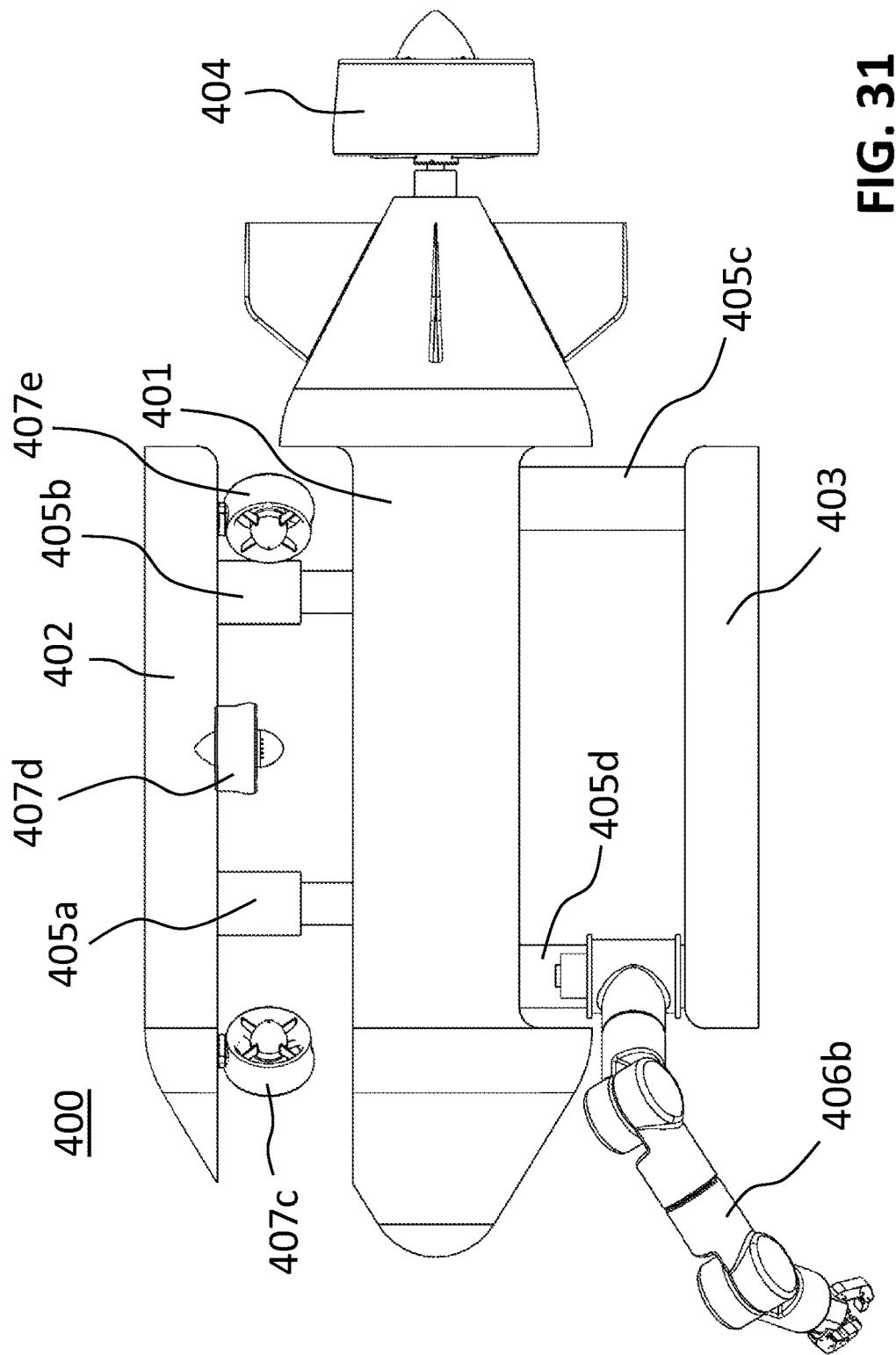
FIG. 31 shows a side view of a subsea robot with extended arms in accordance with one or more embodiments of the present disclosure.

FIG. 30 and FIG. 31 respectively show perspective and side views of a subsea robot 400 with extended arms in accordance with yet another embodiment of the present disclosure. FIG. 30 and FIG. 31 show the subsea robot 400 including the at least one main thruster 404 in the second configuration such that the top retractable component 402 and the bottom retractable component 403 are connected to the middle body 401 via a plurality of actuators 405a, 405b, 405c, and 405d. The plurality of actuators 405a, 405b, 405c, and 405d extend and retract the top retractable component 402 and the bottom retractable component 403 to transform the subsea robot 400 between two or more configurations, including the first and the second configuration. The plurality of actuators 405a, 405b, 405c, and 405d of the subsea robot 400 results in movement of the top retractable component 402 and the bottom retractable component 403 of the subsea robot 400 up or down, and therefore, results in a change in the overall shape of the subsea robot 400. The re-configurable body of the subsea robot 400, in the second configuration, has a shape configured for performing at least one robotic task in the subsea environment. In the second configuration, the plurality of arms 406a and 406b, and/or the plurality of thrusters 407a to 407e are extended to perform task related to the second configuration as described in the present disclosure.

FIG. 30 and FIG. 31 show an exemplary embodiment of the subsea robot 400 such that the plurality of arms 406a and 406b are extended from the area between the bottom retractable component 403 and the middle body 401 and also that the plurality of thrusters 407a to 407e are extended from the area between the top retractable component 402 and the middle body 401. It is noted that the plurality of arms 406a and 406b, and/or the plurality of thrusters 407a to 407e may be extended from the area between the top retractable component 402 and the middle body 401 and/or from the area between the bottom retractable component 403 and the middle body 401 in any order or configuration. Therefore, the exemplary illustration of the plurality of arms 406a and 406b and the plurality of thrusters 407a to 407e in the drawings is not intended to limit the scope of the present disclosure.

While the present disclosure has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What claimed is:

1. A submersible robot comprising:
    a re-configurable body transformable between at least a first configuration and a second configuration,
    wherein the re-configurable body, in the first configuration, has a hydrodynamic shape configured for travel in a subsea environment,
    wherein the re-configurable body, in the second configuration, has a shape configured for hovering and performing a robotic task in the subsea environment, and
    wherein the first configuration is more efficient for travel with respect to the second configuration.

2. The submersible robot according to claim 1, wherein in the first configuration the re-configurable body has an elongated shape and is hydrodynamically designed for travel in the subsea environment generally along a longitudinal axis of the elongated shape.

3. The submersible robot according to claim 1, wherein the re-configurable body comprises a head section and a tail section, and wherein in the first configuration a longitudinal axis of the head section and a longitudinal axis of the tail section are coincident.

4. The submersible robot according to claim 3, wherein in the second configuration the longitudinal axis of the head section and the longitudinal axis of the tail section are intersecting.

5. The submersible robot according to claim 4, wherein the re-configurable body is transformable among the first configuration, the second configuration, and a third configuration, wherein in the third configuration an angle of intersection of the longitudinal axis of the head section and the longitudinal axis of the tail section is different from an angle of intersection of the longitudinal axis of the head section and the longitudinal axis of the tail section in the second configuration.

6. The submersible robot according to claim 4, further comprising a joint connecting the head section and the tail section.

7. The submersible robot according to claim 4, further comprising at least one robotic arm, wherein the at least one robotic arm is disposed in a retracted position when the re-configurable body is in the first configuration and is disposed in an extended position when the re-configurable body is in the second configuration.

8. The submersible robot according to claim 7, wherein when the at least one robotic arm is in the retracted position, the at least one robotic arm is housed in a retracted arm enclosure.

9. The submersible robot according to claim 8, further comprising a side thruster disposed within the retracted arm enclosure.

10. The submersible robot according to claim 8, wherein the retracted arm enclosure extends along a portion of both the head section and the tail section.

11. The submersible robot according to claim 10, further comprising a first side thruster disposed within a head section portion of the retracted arm enclosure and a second side thruster disposed within a tail section portion of the retracted arm enclosure.

12. The submersible robot according to claim 7, wherein the at least one robotic arm comprises a first arm joint disposed proximal the re-configurable body, a working mechanism disposed distal the re-configurable body, and a second arm joint disposed between the first arm joint and the working mechanism.

13. The submersible robot according to claim 1, wherein the re-configurable body comprises a head section and a tail section, and wherein in the second configuration a longitudinal axis of the head section and a longitudinal axis of the tail section are intersecting.

14. The submersible robot according to claim 1, further comprising a main thruster configured, when disposed in a first position, to propel the submersible robot generally along a longitudinal axis of the re-configurable body when the re-configurable body is in the first configuration.

15. The submersible robot according to claim 14, further comprising a plurality of deployable thrusters configured for deployment when the re-configurable body is in a configuration other than the first configuration.

16. The submersible robot according to claim 15, wherein the plurality of deployable thrusters are housed in thruster enclosures when the re-configurable body is in the first configuration.

17. The submersible robot according to claim 15, wherein when the re-configurable body is in the configuration other than the first configuration, the main thruster is movable to a second position, and wherein the main thruster and the plurality of deployable thrusters cooperatively provide navigation capability to the submersible robot.

18. The submersible robot according to claim 1, further comprising a plurality of deployable thrusters configured for deployment when the re-configurable body is in a configuration other than the first configuration.

19. The submersible robot according to claim 18, wherein the plurality of deployable thrusters are housed in thruster enclosures when the re-configurable body is in the first configuration.

20. The submersible robot according to claim 1, further comprising a plurality of deployable thrusters configured for deployment when the re-configurable body is the first configuration.

21. The submersible robot according to claim 1, further comprising at least one robotic arm, wherein the at least one robotic arm is disposed in a retracted position when the re-configurable body is in the first configuration and is disposed in an extended position when the re-configurable body is in the second configuration.

22. The submersible robot according to claim 21, wherein when the at least one robotic arm is in the retracted position, the at least one robotic arm is housed in a retracted arm enclosure.

23. The submersible robot according to claim 22, further comprising a side thruster disposed within the retracted arm enclosure.

24. The submersible robot according to claim 21, wherein the at least one robotic arm comprises a first arm joint disposed proximal the re-configurable body, a working mechanism disposed distal the re-configurable body, and a second arm joint disposed between the first arm joint and the working mechanism.

25. The submersible robot according to claim 1, further comprising an internal power source, a control unit configured to execute instructions for control of the submersible robot, a sensor module configured to sense aspects of the subsea environment in a vicinity of the submersible robot, and a transceiver configured to communicate with a communication station outside the submersible robot.

26. A method for operating a submersible robot in subsea environment, wherein the submersible robot comprises a re-configurable body transformable between at least a first configuration and a second configuration, wherein in the first configuration the re-configurable body has a hydrodynamic shape configured for travel in the subsea environment and in the second configuration the re-configurable body has a shape configured for performing a robotic task in the subsea environment, the method comprising:
- navigating the submersible robot from a first location to a second location with the re-configurable body in the first configuration;
- transforming the submersible robot from the first configuration to the second configuration;
- performing a robotic task with the re-configurable body in the second configuration;
- transforming the submersible robot from the second configuration to the first configuration; and
- navigating the submersible robot from the second location to a third location with the re-configurable body in the first configuration.

27. The method of claim 26, wherein transforming the submersible robot from the first configuration to the second configuration comprises rotating a tail section of the re-configurable body relative to a head section of the re-configurable body.

28. The method of claim 26, wherein transforming the submersible robot from the first configuration to the second configuration comprises moving a robotic arm from a retracted position within a robotic arm enclosure to an extended position.

29. The method of claim 26, wherein transforming the submersible robot from the first configuration to the second configuration comprises deploying a plurality of deployable thrusters.

30. The method of claim 26, wherein performing the robotic task comprises sensing aspects of the subsea environment in a vicinity of the submersible robot.

31. A submersible robot comprising:
- a re-configurable body comprising a head section, a tail section, and a joint connecting the head section and the tail section, wherein the re-configurable body is transformable between at least a first configuration and a second configuration,
- a main thruster;
- a plurality of deployable thrusters;
- a robotic arm; and
- a control module;
- wherein in the first configuration, the head section and the tail section together form an elongated, hydrodynamic shape configured for travel in a subsea environment, the plurality of deployable thrusters are disposed in thruster enclosures, the robotic arm is disposed in a robotic arm enclosure, and propulsion is provided by the main thruster; and
- wherein in the second configuration the tail section is pivoted relative to the head section, the plurality of deployable thrusters are deployed, the robotic arm is extended, and propulsion is provided by a combination of the main thruster and the deployable thrusters.

* * * * *